(12) United States Patent
Nashimoto

(10) Patent No.: US 7,302,140 B2
(45) Date of Patent: Nov. 27, 2007

(54) OPTICAL SWITCH AND MATRIX OPTICAL SWITCH

(75) Inventor: Keiichi Nashimoto, Ayase (JP)

(73) Assignee: Keio University, Tokyo (JP)

( * ) Notice: Subject to any disclaimer, the term of this patent is extended or adjusted under 35 U.S.C. 154(b) by 0 days.

(21) Appl. No.: 11/398,151

(22) Filed: Apr. 5, 2006

(65) Prior Publication Data

US 2006/0257073 A1    Nov. 16, 2006

Related U.S. Application Data

(63) Continuation-in-part of application No. 10/922,601, filed on Aug. 20, 2004, now abandoned.

(51) Int. Cl.
*G02B 6/26* (2006.01)
*G02B 6/42* (2006.01)

(52) U.S. Cl. ............... 385/43; 385/4; 385/8; 385/9; 385/39; 385/40; 385/41; 385/42; 385/43; 385/45; 385/50

(58) Field of Classification Search ............ 385/9, 385/43, 45
See application file for complete search history.

(56) References Cited

U.S. PATENT DOCUMENTS 5,439,782 A * 8/1995 Haemmerle et al. ......... 430/321
6,470,125 B1 * 10/2002 Nashimoto et al. ......... 385/122

FOREIGN PATENT DOCUMENTS

| JP | 6-5350 | 1/1994 |
| JP | 7-318986 | 12/1995 |
| JP | 2000-47272 | 2/2000 |
| JP | 2006-58837 A | 3/2006 |

OTHER PUBLICATIONS

Chen S. Tsai, et al., Optical Channel Waveguide Switch and Coupler Using Total Internal Reflection, IEEE Journal of Quantum Electronics, vol. QE-14, No. 7 Jul. 1978, pp. 513-517.
Kiyotaka Weasa, et al., Optical TIR Switches Using PLZT Thin-Film Waveguide on Sapphire, Journal of Lightwave Technology, vol. LT-2, No. 5 Oct. 1984, pp. 710-714.
Stan West, Dynamic and Reconfigurable Components; Wednesday morning/OFC 2002/187.

* cited by examiner

*Primary Examiner*—Frank G. Font
*Assistant Examiner*—Ryan Lepisto
(74) *Attorney, Agent, or Firm*—Knobbe Martens Olson & Bear, LLP

(57) ABSTRACT

The invention provides an optical switch including a substrate which has conductivity or semiconductivity, an optical waveguide layer which is formed on the substrate, and a control electrode which is formed on the optical waveguide layer. The optical waveguide layer includes an incident-side channel waveguide to which a light signal is incident and plural outgoing-side channel waveguides branched from the incident-side channel waveguide. The control electrode forms a reflection plane reflecting the incident light signal near a crossover portion of the plural outgoing-side channel waveguides by applying voltage to the optical waveguide layer with the substrate to control a refractive index of the optical waveguide layer, and switches propagation paths of the light signal.

34 Claims, 16 Drawing Sheets

F I G. 1 4
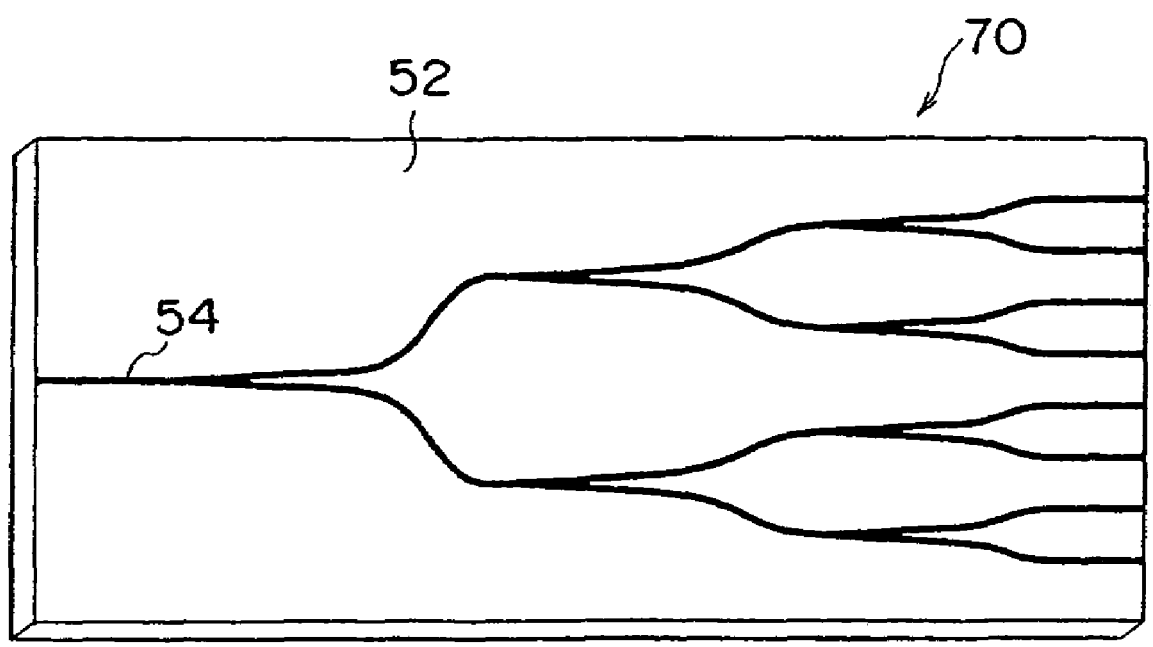

OPTICAL SWITCH AND MATRIX OPTICAL SWITCH

CROSS-REFERENCE TO RELATED APPLICATION

This application is a continuation-in-part of application Ser. No. 10/922,601, filed on Aug. 20, 2004 now abandoned.

BACKGROUND OF THE INVENTION

1. Field of the Invention

The present invention relates to an optical switch and a matrix optical switch, and particularly to an optical switch which switches optical paths of a light signal propagating through a channel waveguide and a matrix optical switch in which multiple of the optical switches are arranged in a matrix.

2. Description of the Related Art

Optical communication networks are developing, from: point-to-point optical communication, in which nodes are connected individually; through optical communication, in which Add-Drop Multiplexing is performed between points; and further to optical communication in which plural nodes are directly connected, without converting a light signal into an electric signal. Therefore, development of various optical components necessary for the above optical communication becomes important, such as optical splitter/couplers, optical multiplexers, optical demultiplexers, optical switches, and the like. Among these, matrix optical switches are some of the most important components, being used for switching light signal paths among plural optical fibers in response to demand, or for switching light signal paths in order to secure diversion paths in the case of a network failure.

The optical switches include a bulk type of optical switches in which prisms, mirrors, fibers, and the like are mechanically moved to switch the light signal paths, and optical waveguide types of optical switch. The bulk type of optical switch has the advantage that wavelength dependence is small and loss is relatively low. However, there are various problems with the bulk type of optical switch such as: low switching speed; unsuitability for formation into matrices, due to the difficulty of miniaturization; unsuitability for mass production, because the assembly and adjustment process is complicated; expense; and the like. On the other hand, because the optical waveguide type of optical switch is significantly superior to the bulk type of optical switch in terms of switching speed, miniaturization, integration, mass production, and the like, the optical waveguide type of optical switch is being avidly investigated.

Optical waveguide type of matrix optical switches can be divided into two main modes. In the first mode, the paths of propagating light signals are switched by connecting a branching type of channel waveguide between input and output ports, and optical switches or optical gates, operated by predetermined principles are arranged at branching points. In the second mode, a light deflector is provided between the input and output ports to deflect the incident light from input ports toward output ports.

Currently, the matrix optical switch of the first mode is being most actively investigated, because of its design flexibility and small optical loss. Generally in the first mode of matrix optical switch, a channel waveguide is formed in a thin film made of $LiNbO_3$, compound semiconductor, quartz, polymer, or the like. At crossover portions on each path there is provided either: an optical switch electrically controlling the direction of travel of the light; or an optical gate, electrically controlling the direction of travel of the light by opening and closing.

The operating principles of the optical switch include: a method of controlling the light signal path by applying an electric field to a directional coupler in which two optical waveguides are arranged close to each other; a Mach-Zehnder type of method in which an input light beam is separated into two light beams by a directional coupler, phase difference is provided between the light beams passing through the respective paths by means of a refractive index generated by an electric field, and output ends are switched by controlling interference states using a directional coupler positioned on an exit side; a method of switching light signal paths by controlling interference between optical modes at X-crossover portions; a so-called digital type of method in which light signal paths are switched by controlling a field distribution in transverse direction of the optical mode, by means of a refractive index generated by an electric field at Y-branching portions or at asymmetrical X-crossover portions; and a method of switching light signal paths in which total reflection or Bragg reflection is made to occur by providing electrodes at X-crossover portions to control the refractive index (Japanese Patent Laid-Open (JP-A) No. 7-318986 and Japanese Patent Publication (JP-B) No. 6-5350).

Among the above, the digital type of optical switch is superior in operational tolerance. In the digital type of optical switch, after light signal paths are switched with a predetermined voltage or current, this state can be maintained, and plural operation points are not generated, even if a voltage or current greater than predetermined is applied thereto. Further, advantages such as a digital type of optical switch independent of the wave polarization being possible, small degree of wavelength dependence, and the like, make the digital type of optical switch particularly noteworthy among optical switches.

However, in the conventional digital type optical switch, when compared with other types of optical switches, there are the problems of increased drive voltage (or increased drive current) and increased electrode length.

FIG. 18 shows a standard Y-branching type of structure for a digital type of optical switch. In the optical switch having the structure shown in FIG. 18, electrodes 2 constituting an optical control portion are provided at the branching portion of a Y-branching type of channel waveguide 1. An acute angle portion of the crossover portion of the channel waveguide 1 has a shape with a crossing angle less than 1° in which the channel separation gradually narrows to become zero. Because of this, with a patterning process of photolithography, it is difficult to produce an ideal shape due to resolution limitations. Therefore, usually it is necessary to form a shape where the tip end is not sharp and the distance between the channels is not less than 1.5 µm, as in the acute angle portion 3 depicted in FIG. 19. The shift from the ideal shape greatly affects the degree of loss and crosstalk, because the optical control portion is located at the branching portion on the downstream side of the crossover portion in the light propagation direction.

For example, with an open angle of the Y-branching of 0.5° and the refractive index of one of the branched waveguides being decreased by about 0.0008 due to the electro-optic effect, as long as the acute angle portion has the ideal shape shown in FIG. 18, crosstalk can be decreased. In other words the difference in light quantity between outgoing ports can be made greater or equal to 20 dB when light from an incident port is guided to the outgoing ports or other.

On the other hand, if the shape is not sharp, as shown in FIG. 19, the difference in light quantity between the outgoing ports is degraded to about 12 dB. In order to increase the difference in light quantity between the outgoing ports to 20 dB, a larger change in refractive index is required. That is, in a Y-branching type of digital optical switch, there is a problem that a drive voltage or drive current increases.

Further, because an electrode is formed on the channel waveguide having a width of a few micrometers, production errors during photolithography easily occur, and symmetry of switching characteristics is easily lost.

In an X-crossover type of total reflection optical switch, as shown in FIG. 20, digital type of operation can also be performed. An X-crossover type of total reflection optical switch is suitable for high-speed response because electrode length can be more easily shortened when compared with other types. In addition, because the optical control portion is located within the crossover portion, unlike in a Y-branching type of optical switch, the X-crossover type of total reflection optical switch is less sensitive to the above-described production limitations. In the total reflection optical switch, an incident light beam 4 propagates rectilinearly when the refractive index of a channel waveguide 1 is uniform. When a voltage is applied to an electrode 2 to decrease the refractive index of a reflection plane 5 to the refractive index necessary for total reflection, the incident light beam 4 is totally reflected in the reflection plane 5. A crossing angle 6 of the channel waveguide 1 and an angle formed by the incident light beam 4 and the reflection plane 5 (reflection supplementary angle 7) are determined by the degree of decrease in refractive index of the reflection plane 5. The degree of decrease in refractive index becomes smaller, i.e., a drive voltage or drive current is lowered, as the crossing angle 6 and the reflection supplementary angle 7 are decreased. The crossing angle 6 can usually be decreased to about 0.5°.

However, in reality, the crossing angle of the X-shaped crossover portion is in the range of about 1° to about 2°, and there is a problem that drive voltage increases or crosstalk increases.

For example, an X-crossover type of total reflection optical switch in which a channel waveguide having a width of 4 μm with a crossing angle of 1.0° is formed by diffusing Ti into $LiNbO_3$ is described in C. S. Tsai, et al., J. Quantum Electronics, (1978) 513. In the total reflection optical switch, it is expected that a response speed of 5.9 GHz can be obtained by providing electrodes with a gap of 4 μm while a taper type channel waveguide having a maximum width of 40 μm is provided in order to decrease crosstalk at the crossover portion. However, the drive voltage becomes as large as 50V.

The X-crossover type of total reflection optical switch in which an epitaxial PLZT thin film waveguide layer is grown on a sapphire substrate, which is an insulating material, to form a channel waveguide having a crossing angle of 2.0° and a width of 20 μm is described in K. Wasa, et al., J. Lightwave Technology, (1984) 710. In the total reflection optical switch, the X-crossover type of total reflection optical switch is formed by providing electrodes with a gap of 4 μm on the channel waveguide, and a response speed of 1 GHz is obtained at 4.7V. However, crosstalk is still as large as 12 dB.

An X-crossover type of total reflection optical switch having a crossing angle of 4.0° and a width of 14 μm, which is formed by using a polymer waveguide, is described in T. Ichigi et al., OFC 2002, 187. In the total reflection optical switch, crosstalk is decreased such that the difference in light quantity between outgoing ports is 30 dB or greater. However, drive electric power as large as 100 mW is required because the thermo-optic effect is utilized, and the response speed is only about 1 ms. That is, when the crossing angle of the X-crossover portion is relatively large, while crosstalk is decreased, electric power consumption is increased. In an optical switch made of polymer, since the thermo-optic effect is utilized, the merit of a high-speed response of the total reflection optical switch cannot be utilized.

As described above, in a total reflection optical switch operated by controlling the refractive index, a digital type of response can be obtained, and the total reflection optical switch is suitable for a high-speed response. However, with the total reflection type it is difficult to obtain an optical switch in which both the drive voltage or drive current is low and crosstalk is low.

SUMMARY OF THE INVENTION

In view of the foregoing, the invention provides an optical switch that is of a total reflection optical switch in which a digital response and miniaturization can be realized, and in which a drive voltage or a drive current is low and crosstalk is decreased, and a matrix optical switch in which the multiplicity of optical switches are arrayed in a matrix.

An optical switch of a first aspect of the invention includes a substrate which has conductivity or semiconductivity, an optical waveguide layer which is formed on the substrate, the optical waveguide layer including an incident-side channel waveguide on which a light signal is incident and plural outgoing-side channel waveguides branching from the incident-side channel waveguide, and a control electrode which is formed on the optical waveguide layer, the control electrode forming, near a crossover portion of the plural outgoing-side channel waveguides, a reflection plane which reflects the incident light signal by applying with the substrate a voltage to the optical waveguide layer to control the refractive index of the optical waveguide layer, and the control electrode switching propagation paths of the light signal.

In the optical switch of the first aspect, the control electrode and the substrate apply voltage to the optical waveguide layer, and a reflection plane is formed near the crossover portion of the plural outgoing-side channel waveguides branched from the incident-side channel waveguide. Therefore, a digital type total reflection optical switch can be formed and an angle (reflection supplementary angle) formed by the centerline of the outgoing-side channel waveguide and the reflection plane can be decreased. For example, even if the crossing angle of the Y-branching outgoing-side channel waveguide is equal to the crossing angle of the X-crossover type of total reflection optical switch, the reflection supplementary angle of the optical switch of the first aspect can become a half of the reflection supplementary angle of the X-crossover type of total reflection optical switch. Therefore, a degree of the decrease in refractive index can be made smaller at the reflection plane and a drive voltage or a drive current can be decreased.

An optical switch of a second aspect of the invention includes a substrate which has conductivity or semiconductivity, an optical waveguide layer which is formed on the substrate, the optical waveguide layer including an incident-side channel waveguide on which a light signal is incident and plural outgoing-side channel waveguides branching from the incident-side channel waveguide, the optical waveguide layer having a grooved portion formed between adjacent outgoing-side channel waveguides, and a control electrode which is formed on the optical waveguide layer, the control electrode forming, near a crossover portion of the plural outgoing-side channel waveguides, a reflection plane which reflects the incident light signal by applying a voltage with the substrate to the optical waveguide layer to control a refractive index of the optical waveguide layer, the reflection plane being contiguous to an interface between the optical waveguide layer and the grooved portion, and the control electrode switching propagation paths of the light signal.

A matrix optical switch of a third aspect of the invention includes a substrate which has conductivity or semiconductivity and plural optical switch units which are arranged in a matrix on the substrate, wherein each of the plural optical switch units includes an optical waveguide layer which is formed on the substrate, the optical waveguide layer including an incident-side channel waveguide on which a light signal is incident and plural outgoing-side channel waveguides branching from the incident-side channel waveguide, and a control electrode which is formed on the optical waveguide layer, the control electrode forming, near a crossover portion of the plural outgoing-side channel waveguides, a reflection plane which reflects the incident light signal by applying a voltage with the substrate to the optical waveguide layer to control the refractive index of the optical waveguide layer, and the control electrode switching propagation paths of the light signal.

A matrix optical switch of a fourth aspect of the invention includes a substrate which has conductivity or semiconductivity and plural optical switch units which are arranged in a matrix on the substrate, wherein each of the plural optical switch units includes an optical waveguide layer which is formed on the substrate, the optical waveguide layer including an incident-side channel waveguide on which a light signal is incident and plural outgoing-side channel waveguides branching from the incident-side channel waveguide, the optical waveguide layer having a grooved portion formed between adjacent outgoing-side channel waveguides, and a control electrode which is formed on the optical waveguide layer, the control electrode forming, near a crossover portion of the plural outgoing-side channel waveguides, a reflection plane reflecting the incident light signal by applying with the substrate a voltage to the optical waveguide layer to control the refractive index of the optical waveguide layer, the reflection plane being contiguous to an interface between the optical waveguide layer and the grooved portion, and the control electrode switching propagation paths of the light signal.

As described above, in accordance with the invention, a total reflection optical switch, in which a digital response and miniaturization can be realized, has an effect that crosstalk is decreased while a drive voltage or a drive current is decreased.

BRIEF DESCRIPTION OF THE DRAWINGS

Preferred embodiment of the present invention will be described in detail based on the following figures, wherein:

FIG. 14 is a plan view showing a schematic configuration of a 1×8 optical switch of Example 4;

DETAILED DESCRIPTION OF THE INVENTION

Referring to the accompanying drawings, an embodiment of the invention will be described in detail below.

(Structure of Optical Switch)

Figure 1:
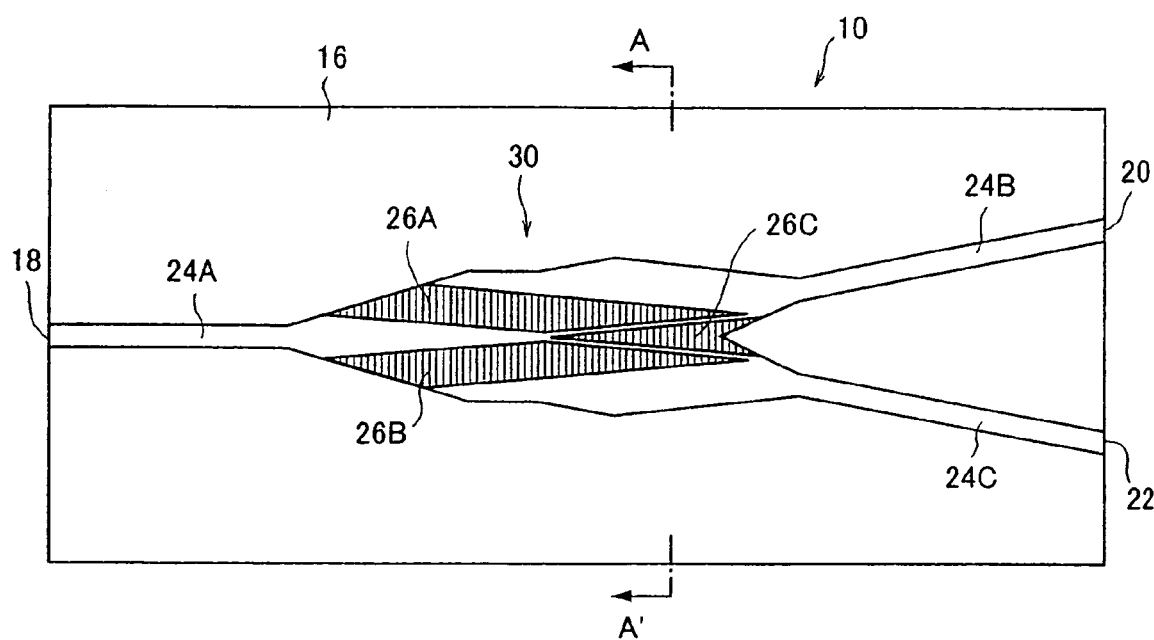
FIG. 1 is a plan view showing a structure of a Y-branching type of 1×2 optical switch according to an embodiment of the invention.
Figure 2:
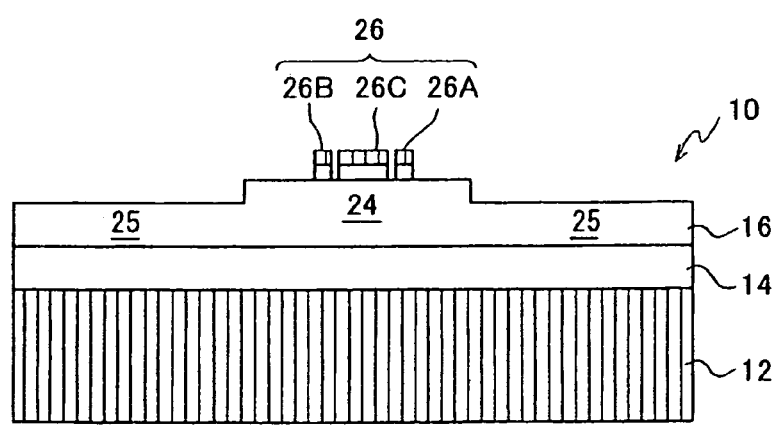
FIG. 2 is a sectional view of the 1×2 optical switch taken on line A-A' of FIG. 1.

FIG. 1 is a plan view of a Y-branching type of optical switch according to an embodiment of the invention, and FIG. 2 is a sectional view of the optical switch taken on line A-A' of FIG. 1.

As shown in FIGS. 1 and 2, an optical switch 10 includes a conductive substrate 12 which becomes a lower electrode, an optical waveguide layer 16 in which a channel waveguide 24 and a cladding portion 25 are formed, a buffer layer 14, and an upper electrode 26. The signal light propagates through the channel waveguide 24. The buffer layer 14 has the refractive index lower than that of the optical waveguide layer 16. The buffer layer 14 prevents the light propagating through the optical waveguide layer 16 from exuding to the conductive substrate 12. A voltage is applied to the optical waveguide layer 16 with the lower electrode and the upper electrode 26. The cladding portion 25 is formed around the channel waveguide 24 of the optical waveguide layer 16.

The optical waveguide layer 16 is laminated on the conductive substrate 12 through the buffer layer 14, and the upper electrode 26 is formed on the optical waveguide layer 16. It is also possible that a cladding layer having the refractive index lower than that of the optical waveguide layer 16 is provided between the optical waveguide layer 16 and the upper electrode 26. In the optical switch 10, the refractive index of the optical waveguide layer 16 is partially decreased by applying a voltage between the upper and lower electrodes, which allows a reflection plane to be formed along an edge of the upper electrode 26 in the optical waveguide layer 16 to switch the propagation path of the signal light.

The optical switch 10 is a 1×2 optical switch including one incident port 18 and two outgoing ports 20 and 22. The channel waveguide 24 branched in the Y-shape is formed in the optical waveguide layer 16. The Y-shaped channel waveguide 24 includes a channel waveguide 24A and channel waveguides 24B and 24C branched from the channel waveguide 24A. A light signal is incident to the channel waveguide 24A from the incident port 18. The channel waveguides 24B and 24C output the light signal to the outgoing ports 20 and 22, respectively.

Figure 3:
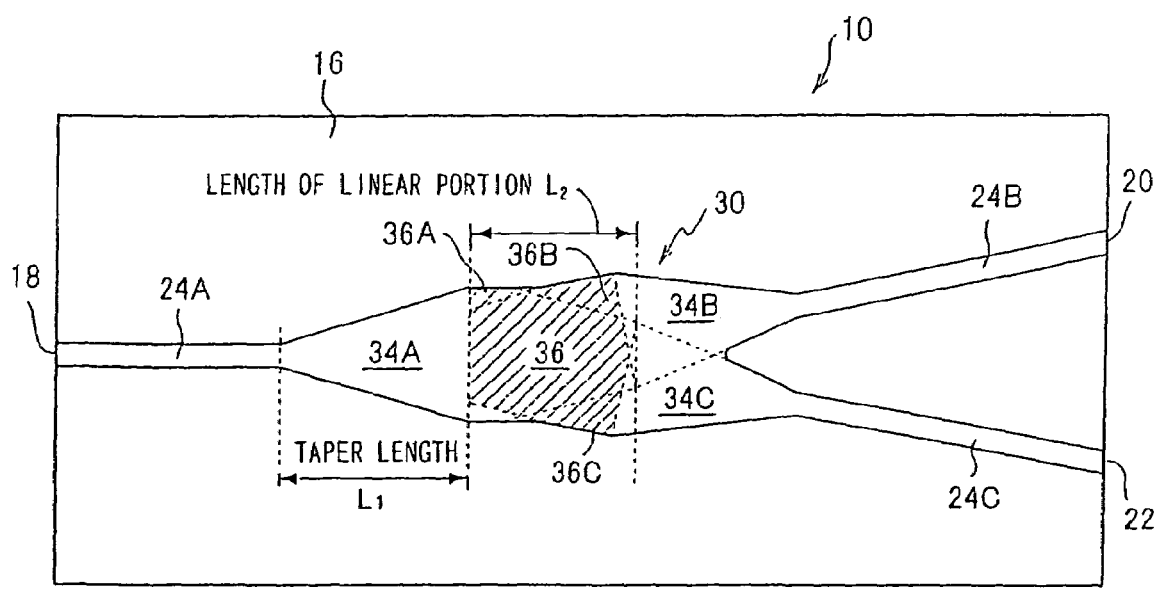
FIG. 3 is a plan view showing a waveguide structure of the 1×2 optical switch of FIG. 1.

As shown in FIG. 3, a taper portion 34A is formed in a tapered shape on the outgoing side of the channel waveguide 24A so as to extend toward the propagation direction of the light signal. A linear portion 36A is continuously added to the taper portion 34A. Taper portions 34B and 34C are formed in a reversely tapered shape on the incident sides of the channel waveguides 24B and 24C so as to extend toward the opposite direction to the propagation direction of the light signal. Linear portions 36B and 36C are continuously added to taper portions 34B and 34C respectively. Therefore, a Y-crossover portion 30 in which these channel waveguides are crossed with each other is formed in a widened shape by the taper portions 34A, 34B, and 34C and a linear portion 36 including the linear portions 36A, 36B, and 36C, and the crosstalk is prevented. It is possible that the linear portion 36 including the linear portions 36A, 36B, and 36C may not be provided, if appropriate, in accordance with a degree of crossover among the taper portions 34A, 34B, and 34C.

Figure 4A:
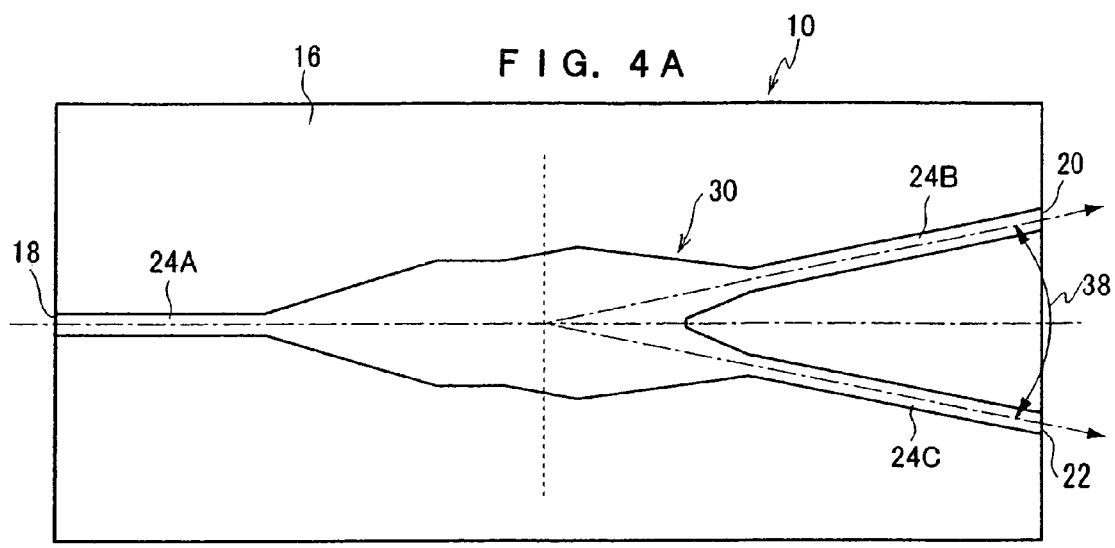
FIGS. 4A to 4C are a plan view for explaining operation of the 1×2 optical switch of FIG. 1.

FIG. 4A shows each of centerlines of the channel waveguides 24A, 24B, and 24C. A crossing angle 38 is one which is formed at the Y crossover portion 30 by the centerline of the channel waveguide 24B and the centerline of the channel waveguides 24C. The crossing angle 38 has the same value in both an X-crossover and an Y-crossover. In order to decrease drive voltage (or drive current) to the range from about 5V to about 20V, it is preferable that the crossing angle 38 ranges from 0.25° to 2.0°.

As shown in FIG. 1, upper electrodes 26A, 26B, and 26C are disposed as a control electrode on the Y-crossover portion 30. Each of the upper electrodes 26A, 26B, and 26C is arranged in a predetermined layout so that signal light 44 incident from the incident port 18 is totally reflected from the reflection plane formed along the edge of each electrode to be outputted to the outgoing port 20 or 22.

Figure 4B:
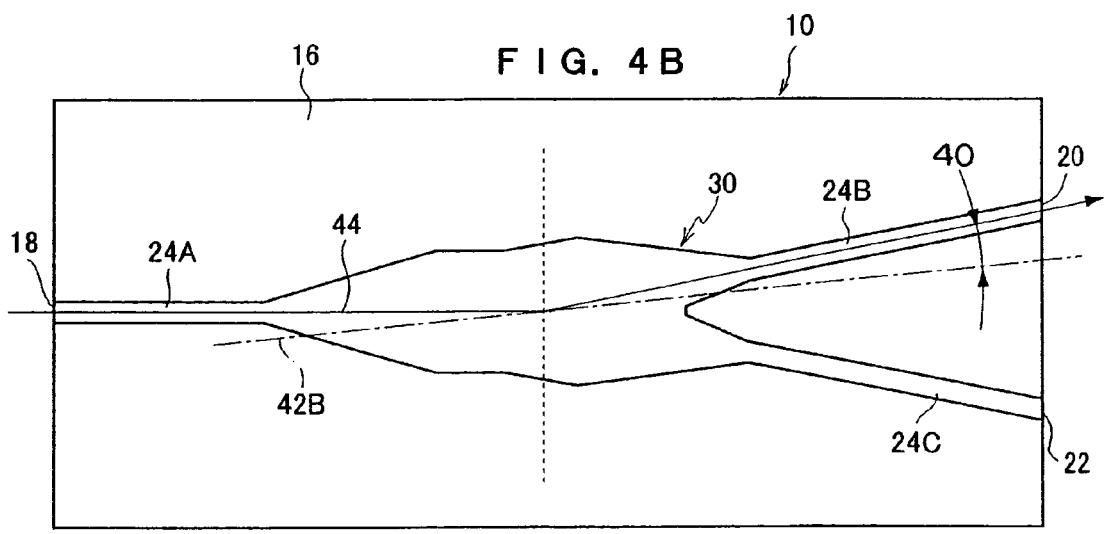

For example, when the signal light is coupled to the outgoing port 20, as shown in FIG. 4B, a voltage is applied between the conductive substrate 12 and the upper electrodes 26B and 26C to form a reflection plane 42B along the edges of the upper electrodes 26B and 26C on the waveguide side. The signal light 44 incident from the incident port 18 propagates along the centerline of the channel waveguide 24A to be totally reflected from the reflection plane 42B, and the signal light 44 is outputted to the outgoing port 20 along the centerline of the channel waveguide 24B.

The condition of the total reflection is that the angle formed by the centerline of the channel waveguide 24A and the reflection plane 42B becomes equal to the angle formed by the centerline of the channel waveguide 24B and the reflection plane 42B. The angle of the total reflection is a total reflection supplementary angle 40.

Figure 4C:
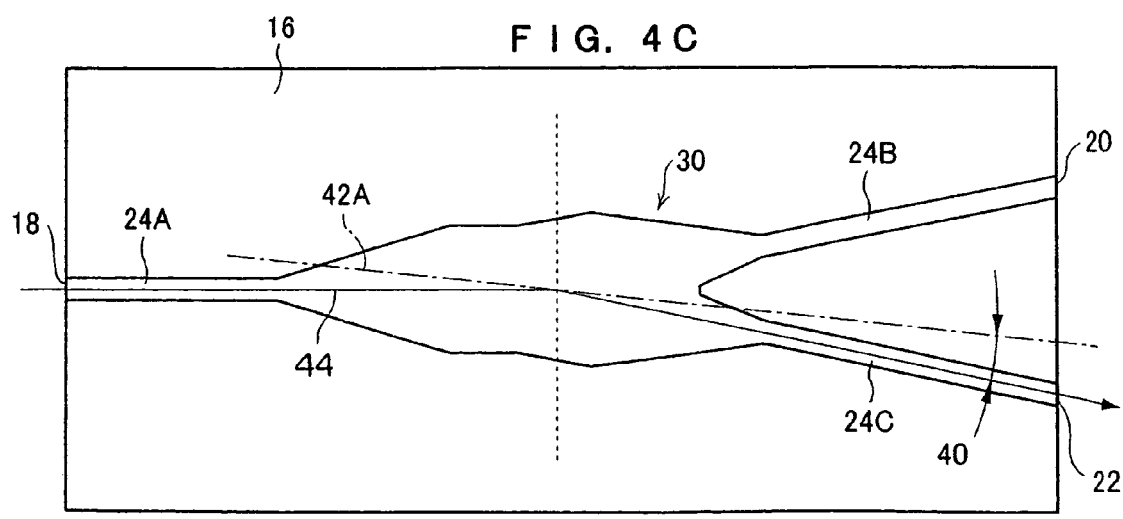

Similarly, when the signal light is coupled to the outgoing port 22, as shown in FIG. 4C, a voltage is applied between the conductive substrate 12 and the upper electrodes 26A and 26C to form a reflection plane 42A along the edges of the upper electrodes 26A and 26C on the waveguide side. The signal light 44 incident from the incident port 18 propagates along the centerline of the channel waveguide 24A to be totally reflected from the reflection plane 42A, and the signal light 44 is outputted to the outgoing port 22 along the centerline of the channel waveguide 24C.

Figure 10:
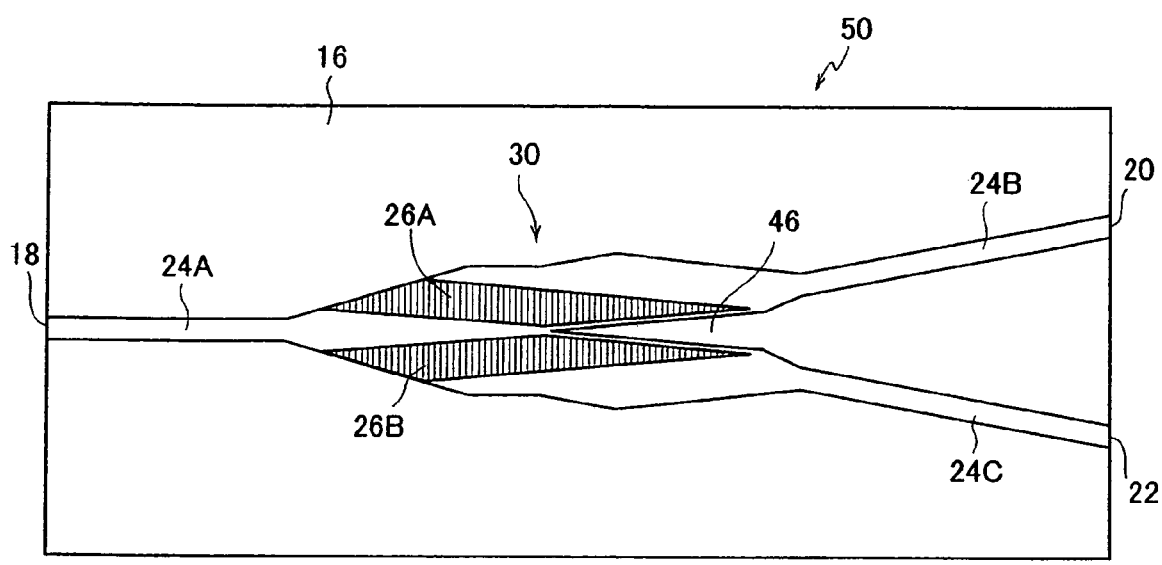
FIG. 10 is a plan view showing another structure of the Y-branching type of 1×2 optical switch of the invention.

The upper electrode 26C is formed in a triangle having two sides that are the edges along the reflection plane 42A and along the reflection plane 42B, respectively. The upper electrode 26C is used as a common electrode to which a voltage is applied when the signal light 44 is coupled to either of the outgoing port 20 or 22. Instead of the formation of the upper electrode 26C, as shown in FIG. 10, it is also possible that a part of the channel waveguide corresponding to the upper electrode 26C is removed by etching or the like to form a groove portion (trench) 46. In an optical switch 50, the switching can be performed only by applying the voltage to the upper electrodes formed at two positions, which simplifies the control of the refractive index.

Although the total reflection supplementary angle is a half of the crossing angle in an X-crossover, the total reflection supplementary angle 40 can be set to a quarter of the crossing angle 38 in the optical switch having the above-described structure because the optical switch has a Y-crossover. Therefore, the decrease in refractive index can be suppressed to a small amount in the reflection plane 42B, which allows the drive voltage or the drive current to be decreased. The reflection plane is not formed on the branched channel waveguides 24B and 24C, but the reflection plane is formed by providing the electrode on the Y-crossover portion 30, so that the reflection plane is hardly affected by the shape of the branching portion or a production error of the upper electrode 26, and degradation of the crosstalk is decreased when compared with the conventional Y-branching optical switch. In particular, the upper electrode 26 is formed on the Y-crossover portion 30 having a large area in the embodiment, so that the degradation of the switching characteristics is hardly generated by the production error of the upper electrode 26.

(Structure of Taper Portion)

The preferable structures of the taper portion and the linear portion in the channel waveguide 24 will be described below.

It is preferable that the maximum width of the taper portion ranges from 5 μm to 50 μm. The maximum width of the taper portion is appropriately optimized in accordance with the refractive index of the optical waveguide layer, the difference in refractive index between the channel waveguide and the cladding portion, the width of the channel waveguide, the crossing angle, and the like.

Figure 6:
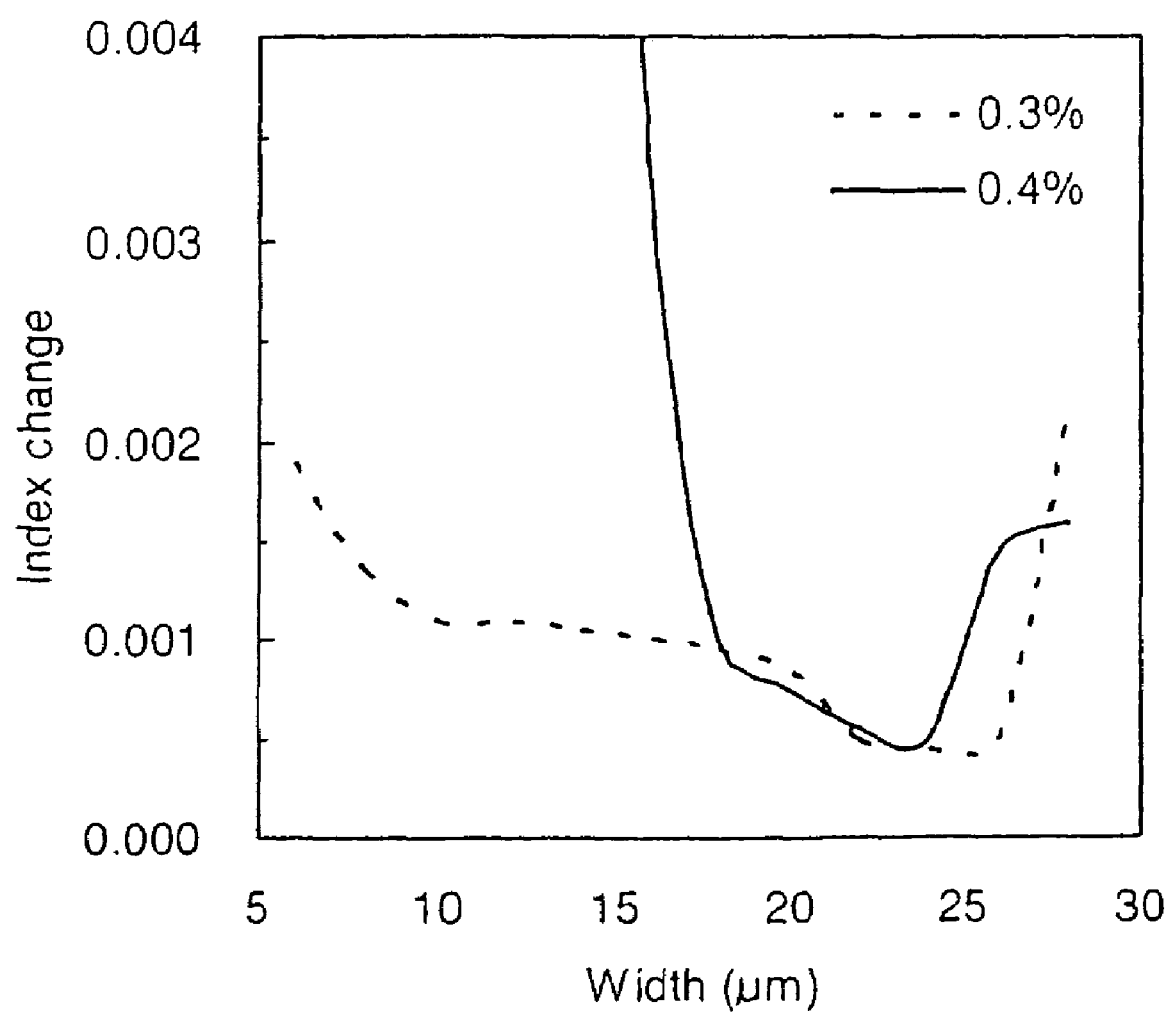
FIG. 6 is a graph showing calculation result of a change in refractive index necessary to obtain a 20-dB crosstalk when a maximum width of a taper portion is changed.

FIG. 6 shows calculation result of the change in refractive index necessary to obtain a 20-dB crosstalk when the maximum width of the taper portion is variously changed on the following conditions with respect to the optical switch according to the embodiment.

Refractive index of optical waveguide layer: 2.43

Difference in refractive index between channel waveguide and cladding portion: 0.3% or 0.4%

Width of channel waveguide: 4 μm

Taper length ($L_1$ of FIG. 3): 700 μm

Y-crossing angle: 0.5°

As can be seen from FIG. 6, when the maximum width of the taper portion is less than 10 μm, a large and rapid change in refractive index is required. Therefore, in order not to generate the degradation of the switching characteristics, it is desirable that the maximum width of the taper portion is not lower than at least 10 μm, and more preferably 18 μm or more. Since a large change in refractive index is also required when the maximum width of the taper portion is more than 26 μm, it is desirable that the maximum width of the taper portion is not more than at least 26 μm, and more preferably 24 μm or less.

It is preferable that the taper length ranges from 200 μm to 2000 μm. The taper length is appropriately optimized in accordance with the refractive index of the optical waveguide layer, the difference in refractive index between the channel waveguide and the cladding portion, the width of the channel waveguide, the crossing angle, and the like. When the taper length is shorter than 200 μm, degradation of the switching characteristics or increase in radiation loss is generated. On the other hand, when the taper length is longer than 2000 μm, the switching characteristics are also gradually degraded. Further, when the taper length is increased, there is a problem that the device becomes large or the like.

Figure 7:
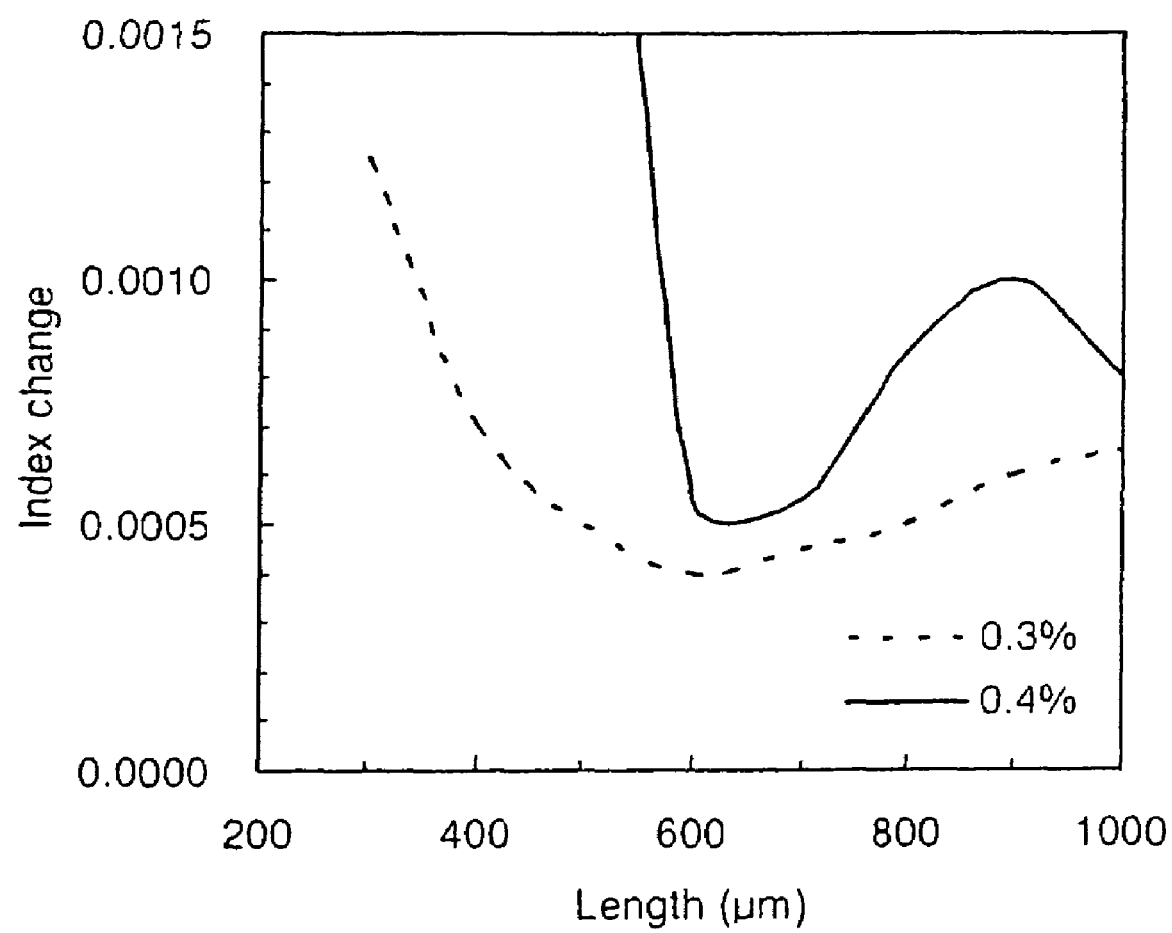
FIG. 7 is a graph showing calculation result of a change in refractive index necessary to obtain a 20-dB crosstalk when a taper length is changed.

FIG. 7 shows the calculation result of the change in refractive index necessary to obtain a 20-dB crosstalk when the taper length is variously changed on the following conditions with respect to the optical switch according to the embodiment.

Refractive index of optical waveguide layer: 2.43
Difference in refractive index between channel waveguide and cladding portion: 0.3% or 0.4%
Width of channel waveguide: 4 μm
Maximum width of taper portion: 22 μm
Y-crossing angle: 0.5°

As can be seen from FIG. 7, when the taper length is less than 600 μm, a large and rapid change in refractive index is required. Therefore, in order not to generate degradation of the switching characteristics, it is desirable that the taper length is not less than 600 μm. Although a somewhat large change in refractive index is also required when the taper length is in the range from 700 μm to 800 μm, the switching characteristics are not remarkably degraded. Therefore, in view of miniaturization of the device, it is desirable that the taper length is not more than 1000 μm.

It is also possible that the taper length on the incident-side of the channel waveguide is different from the taper length on the outgoing-side of the channel waveguide. The switching characteristics can be optimized by the different taper lengths.

The length of the linear portion ($L_2$ of FIG. 3) connected to the taper portion can be mainly determined by the relationship with the taper length. It is preferable that the length of the linear portion ranges up to 1600 μm. The length of the linear portion is appropriately optimized in accordance with the refractive index of the optical waveguide layer, the difference in refractive index between the channel waveguide and the cladding portion, the width of the channel waveguide, the crossing angle, and the like. When the length of the linear portion is shorter than 200 μm, the tendency of the switching characteristics degradation is generated. On the other hand, when the length of the linear portion is longer than 1600 μm, the switching characteristics are also degraded. Further, there is a problem that the device becomes large or the like.

Figure 8:
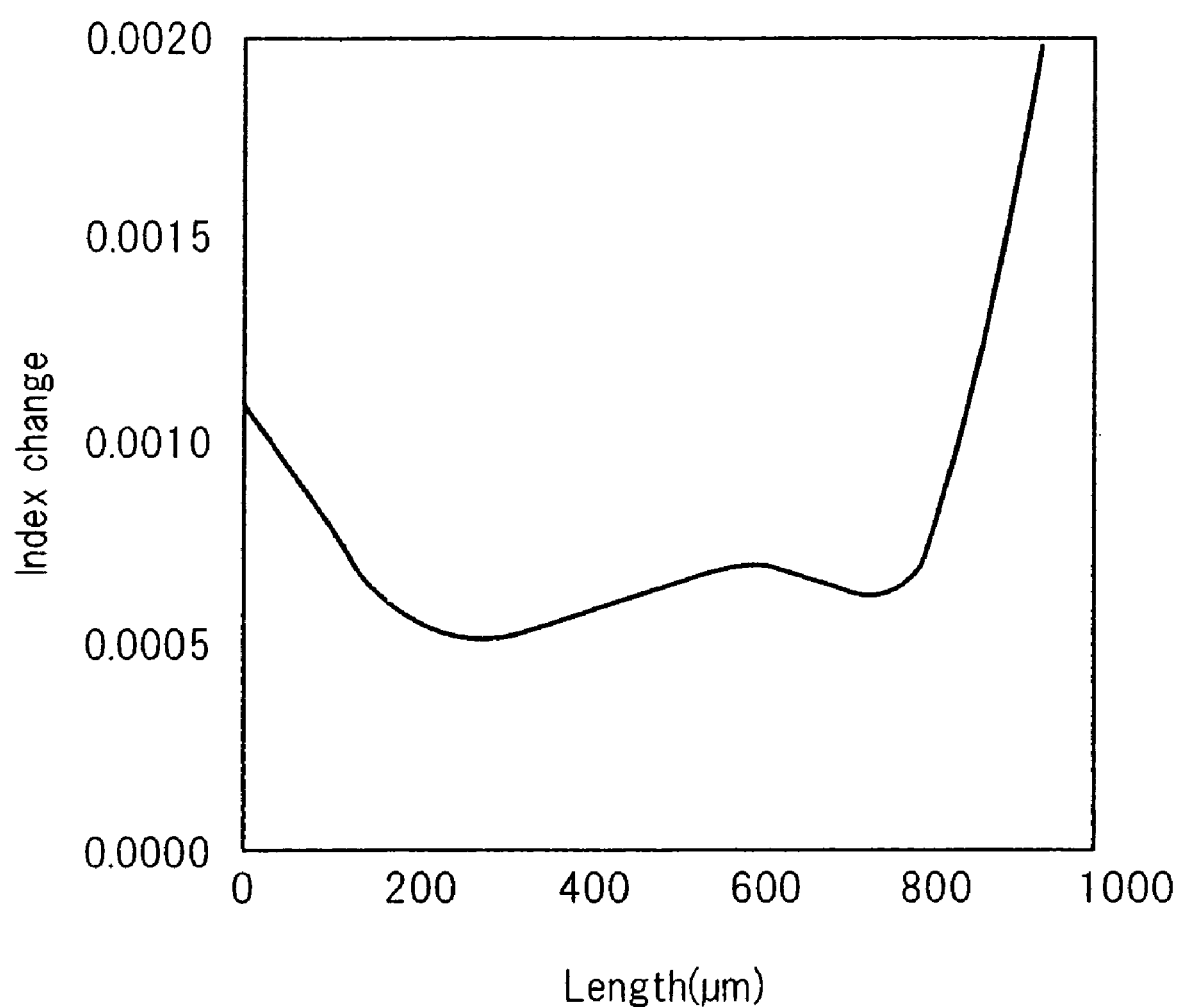
FIG. 8 is a graph showing calculation result of a change in refractive index necessary to obtain a 20-dB crosstalk when a length of a linear portion is changed.

FIG. 8 shows the calculation result of the change in refractive index necessary to obtain a 20-dB crosstalk when the length of the linear portion is variously changed on the following conditions with respect to the optical switch according to the embodiment.

Refractive index of optical waveguide layer: 2.43
Difference in refractive index between channel waveguide and cladding portion: 0.4%
Width of channel waveguide: 4 μm
Maximum width of taper portion: 22 μm
Taper length $L_1$: 700 μm
Y-crossing angle: 0.5°

As can be seen from FIG. 8, it is desirable that the length of the linear portion ranges from 200 μm to 800 μm. In the structure of the taper portion described above, an optimal value is determined based on the difference in refractive index between the channel waveguide and the cladding portion. Although values in the above described range are mainly used, it is obvious that a value smaller or larger than this range can be included.

(Material of Each Layer)

Each layer constituting the optical switch will be described below.

Figure 5:
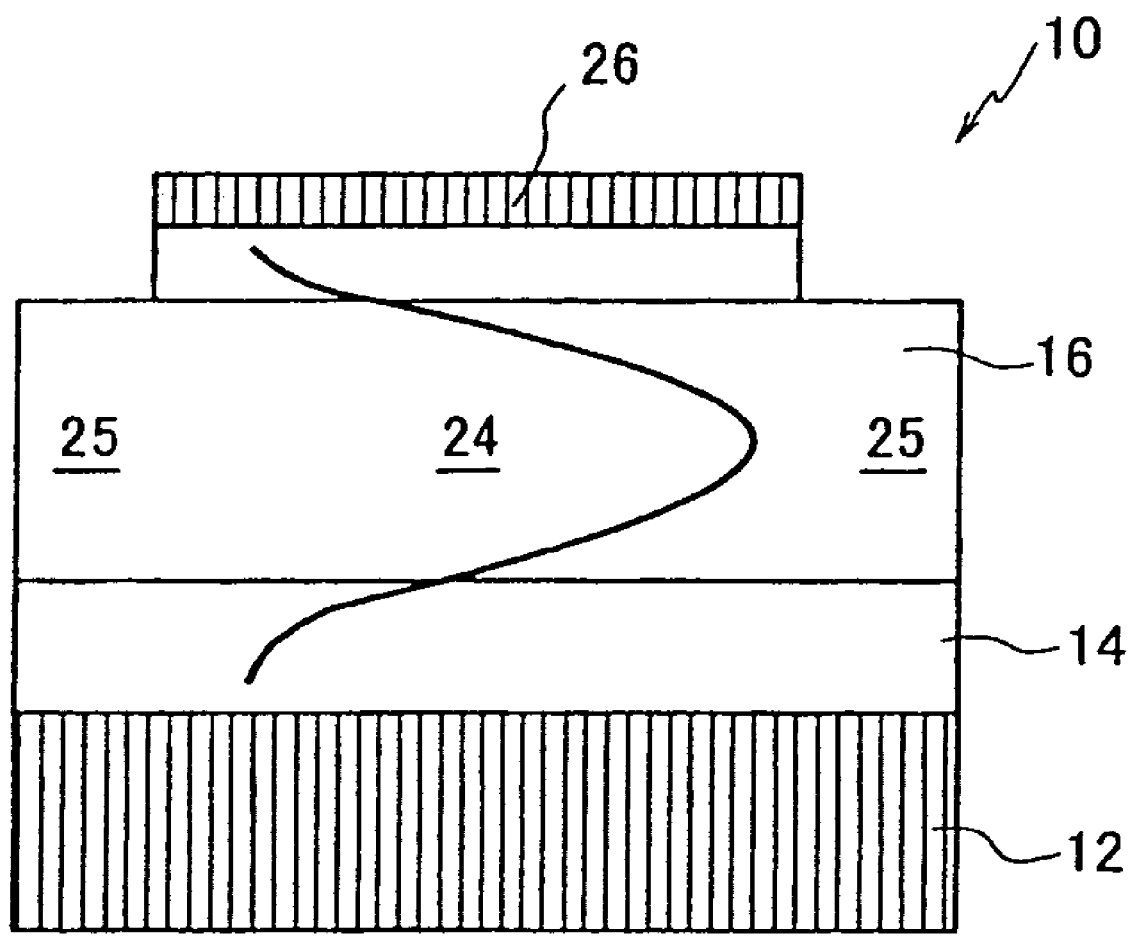
FIG. 5 is a sectional view along a light propagation direction of the 1×2 optical switch of FIG. 1.

When light is introduced into the optical waveguide layer provided on the substrate, generally, part of total light intensity exudes to the conductive substrate having lower transparency, the exuded component is absorbed into the conductive substrate, and propagation loss is generated in accordance with the light propagation. However, as shown in FIG. 5, when a portion of the thickness where exuding occurs is replaced with the buffer layer 14, the exuded component is not absorbed into the conductive substrate 12 and the propagation loss can be decreased. In order that the buffer layer 14 functions as an isolation layer between the optical waveguide layer 16 and the conductive substrate 12, it is necessary that the refractive index of the material of the buffer layer 14 is smaller than that of the optical waveguide layer 16.

In order that the light propagation loss arising from scattering by grain boundaries existing on the surface of the optical waveguide layer 16 or in the optical waveguide layer 16 is decreased to a practical level, it is essential that the material of the buffer layer 14 hold an epitaxial relationship with the material of the conductive substrate or the optical waveguide layer. It is desirable that the material of the optical waveguide layer 16 has a higher electro-optic coefficient, and it is desirable that the material of the conductive substrate 12 has lower resistivity. In order to decrease the propagation loss to a value not more than 1 dB/cm, it is necessary that a film thickness ratio of the buffer layer 14 to the optical waveguide layer 16 should be not less than at least 0.1. When operation is predicated in a $TE_0$ single mode, it is proper to set the film thickness ratio not less than 0.5.

Since the upper electrode 26 is provided on the optical waveguide layer 16, the voltage applied between the upper and lower electrodes is distributed in accordance with each capacity of the optical waveguide layer 16 and the buffer layer 14, which causes decrease in effective voltage that can be applied to the optical waveguide layer 16, when the buffer layer 14 exists between the conductive substrate 12 and the optical waveguide layer 16. However, a higher effective voltage can be applied to the optical waveguide layer 16 by using the buffer layer 14 which has a constant film thickness and high dielectric constant.

In the optical switch having the above-describe structure, $LiNbO_3$, a compound semiconductor, quartz, polymer, and the like can be utilized as the waveguide material. From the viewpoints of high-speed response, low power consumption, low light loss, and miniaturization, it is desirable, in particular, to use the following materials.

A conductive or semiconductive single crystal substrate or a substrate in which an epitaxial thin film or a conductive or semiconductive thin film having a single orientation is provided on the surface can be used as the conductive substrate 12 which is of a lower electrode. An oxide, such as $SrTiO_3$ doped with Nb, La, or the like, Al-doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $Mg_2TiO_4$, and $MgTi_2O_4$; a single semiconductor such as Si, Ge, and diamond; a III-V compound semiconductor such as AlAs, AlSb, AlP, GaAs, GaSb, InP, InAs, InSb, AlGaP, AlLnP, AlGaAs, AlInAs, AlAsSb, GaInAs, GaInSb, GaAsSb, and InAsSb; a II-VI compound semiconductor such as ZnS, ZnSe, ZnTe, CaSe, CdTe, HgSe, HgTe, and CdS; and a metal such as Pd, Pt, Al, Au, and Ag can be used as the conductive or semiconductive material.

An oxide such as $SrTiO_3$, $BaTiO_3$, $BaZrO_3$, $LaAlO_3$, $ZrO_2$, 8% $Y_2O_3$—$ZrO_2$, MgO, $MgAl_2O_4$, $LiNbO_3$, $LiTaO_3$, $Al_2O_3$, and ZnO; a single semiconductor such as Si, Ge, and diamond; a III-V compound semiconductor such as AlAs, AlSb, AlP, GaAs, GaSb, InP, InAs, InSb, AlGaP, AlLnP, AlGaAs, AlInAs, AlAsSb, GaInAs, GaInSb, GaAsSb, and InAsSb; and a II-VI compound semiconductor such as ZnS, ZnSe, ZnTe, CaSe, CdTe, HgSe, HgTe, and CdS can be used as the substrate material when the epitaxial thin film or the conductive or semiconductive thin film having a single orientation is provided on the surface thereof. When the conductive or semiconductive thin film is provided on the non-oxide substrate, it is effective that an oxide such as $SrTiO_3$, $BaTiO_3$, $BaZrO_3$, $LaAlO_3$, $ZrO_2$, 8% $Y_2O_3$—$ZrO_2$, MgO, $MgAl_2O_4$, $LiNbO_3$, $LiTaO_3$, $Al_2O_3$, and ZnO is formed as the buffer layer on the surface of the non-oxide substrate, and thereafter, the conductive or semiconductive thin film is formed thereon.

The material which has the refractive index lower than that of the optical waveguide layer 16 and the relative dielectric constant not less than 8 is used as the buffer layer 14. The ratio of the relative dielectric constant of the buffer layer 14 to the relative dielectric constant of the optical waveguide layer 16 is preferably not less than 0.002, and the ratio is more preferably not less than 0.006. It is necessary that the material of the buffer layer 14 holds an epitaxial relationship with the materials of the conductive substrate 12 and the optical waveguide layer 16. A similar crystal structure and a difference in lattice constant of not more than 10% can be cited as the condition that the epitaxial relationship can be held. However, as long as the epitaxial relationship can be held, it is not always necessary to satisfy the condition.

Specifically, in a perovskite type of oxide of an $ABO_3$ type, $SrTiO_3$, $BaTiO_3$, $(Sr_{1-x}Ba_x)TiO_3$ (0<x<1.0), $PbTiO_3$, $Pb_{1-x}La_x(Zr_yTi_{1-y})_{1-x/4}O_3$ (0<x<0.3, 0<y<1.0, and PZT, PLT, and PLZT depending on values of x and y), $Pb(Mg_{1/3}Nb_{2/3})O_3$, and $KNbO_3$ can be cited as a tetragonal system, a trigonal system, an orthorhombic system, or a quasi-cubic system, and a ferroelectric substance such as $LiNbO_3$ and $LiTaO_3$ can be cited as a hexagonal system. In a tungsten bronze type of oxide, $Sr_xBa_{1-x}Nb_2O_6$ and $Pb_xBa_{1-x}Nb_2O_6$ can be cited. $Bi_4Ti_3O_{12}$, $Pb_2KNb_5O_{15}$, $K_3Li_2Nb_5O_{15}$, and ZnO and substituted derivatives of these compounds can be cited in addition to the above materials.

It is preferable that the film thickness of the buffer layer 14 is not less than 10 nm. As described above, the film thickness ratio of the buffer layer 14 to the optical waveguide layer 16 is preferably not less than 0.1, and the ratio is more preferably not less than 0.5.

The oxide having a refractive index larger than that of the buffer layer 14 is used for the optical waveguide layer 16. Specifically, in the perovskite type of oxide of the $ABO_3$ type, $BaTiO_3$, $PbTiO_3$, $Pb_{1-x}La_x(Zr_yTi_{1-y})_{1-x/4}O_3$ (PZT, PLT, and PLZT depending on values of x and y), $Pb(Mg_{1/3}Nb_{2/3})O_3$, and $KNbO_3$ can be cited as the tetragonal system, the trigonal system, the orthorhombic system, or the quasi-cubic system, and the ferroelectric substance such as $LiNbO_3$ and $LiTaO_3$ can be cited as the hexagonal system. In the tungsten bronze type of oxide, $Sr_xBa_{1-x}Nb_2O_6$ and $Pb_xBa_{1-x}Nb_2O_6$ can be cited. $Bi_4Ti_3O_{12}$, $Pb_2KNb_5O_{15}$, and $K_3Li_2Nb_5O_{15}$ and substituted derivatives of these compounds can be cited in addition to the above materials.

Usually the film thickness of the optical waveguide layer 16 is set in the range from 0.1 μm to 10 μm, and the film thickness of the optical waveguide layer 16 can be appropriately selected in accordance with the purpose.

When a cladding layer is provided, the material similar to the buffer layer 14 can be used as the cladding layer. For the material of the cladding layer, it is not always necessary to hold an epitaxial relationship with the optical waveguide layer, and it is possible to use a polycrystalline thin film. When a uniform interface is required, it is necessary to hold the epitaxial relationship with the optical waveguide layer. A similar crystal structure and a difference in lattice constant of not more than 10% can be cited as the condition that the epitaxial relationship can be held. However, as long as the epitaxial relationship can be held, it is not always necessary to satisfy the condition.

Specifically, in the perovskite type of oxide of the $ABO_3$ type, $SrTiO_3$, $BaTiO_3$, $(Sr_{1-x}Ba_x)TiO_3$, $PbTiO_3$, $Pb_{1-x}La_x(Zr_yTi_{1-y})_{1-x/4}O_3$, $Pb(Mg_{1/3}Nb_{2/3})O_3$, and $KNbO_3$ can be cited as the tetragonal system, the trigonal system, the orthorhombic system, or the quasi-cubic system, and the ferroelectric substance such as $LiNbO_3$ and $LiTaO_3$ can be cited as the hexagonal system. In the tungsten bronze type of oxide, $Sr_xBa_{1-x}Nb_2O_6$ and $Pb_xBa_{1-x}Nb_2O_6$ can be cited. $Bi_4Ti_3O_{12}$, $Pb_2KNb_5O_{15}$, $K_3Li_2Nb_5O_{15}$, and ZnO and substituted derivatives of these compounds can be cited in addition to the above materials.

It is preferable that the film thickness of the cladding layer is not less than 10 nm. The film thickness ratio of the cladding layer to the optical waveguide layer 16 is preferably not less than 0.1, and the ratio is more preferably not less than 0.5.

The various combinations satisfying the above-described conditions can be adopted as the combination of the materials of the conductive substrate, the buffer layer, the optical waveguide layer, and the cladding layer. It is preferable to use a doped $SrTiO_3$ single crystal semiconductor substrate, it is preferable that a doped $SrTiO_3$ semiconductor thin film is used as the conductive substrate, or it is preferable to use the substrate in which a $SrRuO_3$ conductive thin film is grown after an MgO buffer layer is grown on the Si single crystal. When the conductive substrate is used, it is most effective that $Pb_{1-x}La_x(Zr_yTi_{1-y})_{1-x/4}O_3$ (PLZT) is used for each of the buffer layer, the optical waveguide layer, and the cladding layer. PLZT has a perovskite structure similar to the above-described conductive substrate, so that the difference in lattice constant is small and good epitaxial growth is possible. PLZT has the refractive index larger than the refractive index of 2.399 of the conductive substrate, and PLZT has a higher electro-optic coefficient. Further, the refractive index of each layer can be largely changed by changing the composition, i.e., the ratio of Pb, La, Zr, and Ti.

The metal such as Al, Ti, Cr, Ni, Cu, Pd, Ag, In, Sn, Ta, W, Ir, Pt, and Au and the alloy of these metals, and the oxide such as Al-doped ZnO, $In_2O_3$, ITO, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $CdGa_2O_4$, $Mg_2TiO_4$, and $MgTi_2O_4$ can be used as the upper electrode 26. When a cladding layer is used, it is desirable to use a metal electrode in which micropatterning can be easily performed. When a cladding layer is not used, it is effective to use an oxide electrode, and it is desirable to use a transparent oxide electrode such as ITO. When fatigue or DC drift is generated with increasing operating time, it is effective to use an oxide electrode.

Each of the cladding layer, the optical waveguide layer, and the buffer layer can be produced by any one of a vapor phase epitaxial growth method such as electron-beam evaporation, flash evaporation, ion plating, RF-magnetron sputtering, ion-beam sputtering, laser abrasion, MBE, CVD, plasma CVD, and MO-CVD; a solid phase epitaxial growth method which heats an amorphous thin film formed by the above-described vapor phase growth; and a solid phase epitaxial growth method which heats the amorphous thin film produced by a wet process such as a sol-gel process and an MOD method.

Among the epitaxial growth methods, the solid phase epitaxial growth method is preferable from the viewpoint of waveguide quality and waveguide patterning. The solid phase epitaxial growth method can include an applying process for applying to the substrate a solution of a metal organic compound such as metal alkoxide and organometallic salt by the wet process such as the sol-gel process and the MOD method; a process for forming the amorphous phase by heating; and a process for performing crystallization by heating. In the solid phase epitaxial growth method described above, facilities cost becomes lower when compared with each of the vapor phase epitaxial growth methods, good uniformity is obtained in a substrate plane, and it is easy to control the refractive index which is important for structure control of the buffer layer, optical waveguide layer, and the cladding layer, so that the optical switch can be produced with good reproducibility. Therefore, in the solid phase epitaxial growth method, it is possible to grow the buffer layer and the like in which light propagation loss is low. The solid phase epitaxial growth method is also most suitable for the patterning because the solid phase epitaxial growth method includes the process for forming an amorphous thin film.

Since the optical switch is produced by the epitaxial growth of each layer, when compared with the conventional material and structure, it is easy to control the refractive index and thickness of each of the substrate, the buffer layer, the thin film optical waveguide, and the cladding layer. For example, when $Pb(Zr_xTi_{1-x})O_3$ (0<x<1.0) is used for the buffer layer, the thin film optical waveguide, and the cladding layer, not only mutual crystal conformation is good, but also the refractive index for the wavelength of 0.633 μm can be selected from a wide range of about 2.45 to about 2.70 in accordance with the composition. Further, the channel waveguides having various shapes can be easily produced by producing each layer by the thin film growth process. Therefore, the effective refractive index of the channel optical waveguide or the difference in refractive index between the channel optical waveguide and the outside can be designed over the wide range, and a curvature of a curved channel can be increased if necessary while the radiation loss is suppressed, so that a large-scale matrix optical switch can be easily produced.

(Modifications)

In the above-described embodiment, it is described that the channel optical waveguide having a ridge structure in which a convex portion is provided on the optical waveguide layer is formed. However, any one of the embedded type, the ridge type, and the rib type which are usually adopted can be used for the channel optical waveguide. When a thin film is laminated by epitaxial growth, it is possible to easily produce the ridge structure in which a convex portion is provided on the optical waveguide layer, the embedded structure in which a convex portion is provided on the optical waveguide layer and then the convex portion is coated by the cladding layer, and the rib structure in which the optical waveguide layer is provided after a concave portion is provided in the buffer layer.

The inventors have invented the structure as follows (Japanese Patent Laid-Open No. 2000-047272). An epitaxial or single-orientated buffer layer is provided on a conductive or semiconductive single crystal substrate which becomes a lower electrode. On the buffer layer, an epitaxial or single-orientated oxide thin film optical waveguide which has the refractive index larger than that of the buffer layer and an electro-optic effect is provided. On the optical waveguide a cladding layer which has the refractive index smaller than that of the optical waveguide and the high dielectric constant is provided if necessary, an the upper electrode is provided on the cladding layer. Therefore, even in the case of an oxide ferroelectric material, the structure in which the optical waveguide is sandwiched between the upper and lower electrodes can be formed, and the low voltage can induce a large change in refractive index without losing the low light-propagation-loss characteristics.

In accordance with the study of the inventors, as described above, the epitaxial or single-orientated buffer layer is provided on the conductive or semiconductive single crystal substrate which becomes the lower electrode, the epitaxial or single-orientated oxide thin film optical waveguide which has the refractive index larger than that of the buffer layer and the electro-optic effect is provided on the buffer layer, and the upper electrode is provided on the optical waveguide. Therefore, the change in refractive index can be effectively performed by applying the voltage to obtain a clear refractive index contrast necessary for the total reflection type of optical switch. As a result, the structure described above is extremely effective for decreasing drive voltage, and the length of each electrode can be significantly reduced.

Further, since the optical switch is produced by the epitaxial growth of each layer, when compared with the conventional material and structure, it is easy to control the refractive index and thickness of each of the substrate, the buffer layer, the thin film optical waveguide, and the cladding layer. For example, when $Pb(Zr_xTi_{1-x})O_3$ (0<x<1.0) is used for the buffer layer, the thin film optical waveguide, and the cladding layer, not only mutual crystal conformation is good, but also the refractive index for the wavelength of 0.633 μm can be selected from a wide range of about 2.45 to about 2.70 in accordance with the composition. Further, the channel waveguides having various shapes can be easily produced by producing each layer by the thin film growth process. Therefore, the effective refractive index of the channel optical waveguide or the difference in refractive index between the channel optical waveguide and the outside can be designed over the wide range, and the curvature of the curved channel can be increased if necessary while the radiation loss is suppressed, so that a large-scale matrix optical switch can be easily produced.

As a result of diligent investigation of various structures of an N×M matrix optical switch, an end face for incidence from N optical fibers and an end face for outgoing to the optical fiber are provided at both ends of the single crystal substrate, wiring between the incident end face and the outgoing end face is performed with the channel optical waveguide and the curved optical waveguide which constitute the total reflection type of optical switch, and the light beam incident from each optical fiber through the incident end face is switched by applying the voltage between the upper and lower electrodes which are provided on the crossover portion of the total reflection type of switch. Therefore, the optical path can be switched to the desired M optical fibers, the switching between ports with a proper interval can be realized with low drive voltage, and the electrode length and the length of the curved channel optical waveguide can be also reduced if necessary, so that the multiplicity of optical switches can be integrated in the substrate wafer having the same size as the conventional one to obtain a large-scale matrix optical switch.

EXAMPLES

Hereinafter, Examples of the invention will be described in detail.

Example 1

The specific Example of the 1×2 optical switch of the Y-branching type above described will be described below.

As shown in FIG. 5, the PLZT buffer layer 14 having the refractive index of 2.410 at the wavelength of 1.55 μm is formed by the solid phase epitaxial growth on the conductive substrate 12 made of Nb-doped SrTiO$_3$ (100) single crystal semiconductor so that the thickness of the buffer layer 14 becomes 2000 nm, and then the PLZT optical waveguide layer 16 having the refractive index of 2.446 is formed by the solid phase epitaxial growth so that the thickness of the optical waveguide layer 16 becomes 2500 nm.

The solid phase epitaxial growth will be described in detail below. Lead acetate anhydride Pb(CH$_3$COO)$_2$, zirconium isopropoxide Zr(O-i-C$_3$H$_7$)$_4$, lanthanum isopropoxide La(O-i-C$_3$H$_7$)$_3$, and titanium isopropoxide Ti(O-i-C$_3$H$_7$)$_4$ are used as a starting material, the starting material is solved in 2-methoxy ethanol, distillation and reflux are performed, and finally PLZT buffer layer precursor solution having concentration of 0.6M in terms of Pb concentration is obtained.

Then, spin coating of the precursor solution is performed onto the substrate made of Nb-doped SrTiO$_3$ (100) single crystal, in which cleaning, etching, and drying are already performed. The substrate is heated in O$_2$ atmosphere and held at 350° C. After the substrate is further held at 750° C., the substrate is cooled. The solid phase epitaxial growth of the PLZT buffer layer 14 is performed by repeating the above process. Similarly, the solid phase epitaxial growth of the PLZT optical waveguide layer 16 is performed.

Then, an electrode pattern is formed by photolithography. After depositing on the PLZT optical waveguide layer 16 a laminated thin film in which an ITO thin film having the thickness of 300 nm and the Au thin film having the thickness of 200 nm are laminated, the patterns of the upper electrodes 26A, 26B, and 26C shown in FIG. 1 are formed by a lift-off method.

Further, the pattern of the channel waveguide 24C shown in FIG. 1 is formed by photolithography, and the channel waveguide 24 having the ridge structure is formed by ICP dry etching. The width of the channel waveguide is 3.0 μm, the taper length is 700 μm, the maximum width of the taper portion is 20 μm, the length of the linear portion is 400 μm, and the Y-crossing angle is 1.0°. The difference in refractive index between the channel waveguide 24 and the cladding portion 25 is 0.4%.

Finally, the substrate is cut into optical switch chips having an overall length of about 6 mm by dicing. The incident end face and the outgoing end face are formed by polishing.

A crystallographic relationship of each layer of the obtained optical switch 10 is as follows. The single-orientated PLZT (100) thin film optical waveguide//PLZT (100) buffer layer//Nb-doped SrTiO$_3$ (100) conductive substrate and in-plane orientation PLZT [001] optical waveguide layer//PLZT [001] buffer layer//Nb-doped SrTiO$_3$ [001] conductive substrate.

The electro-optic coefficient r of 85 pm/V is obtained for the PLZT optical waveguide layer, after initialization voltage, i.e., poling voltage of 100V is applied between the lower electrode of the Nb-doped SrTiO$_3$ substrate and the upper electrode.

Single mode optical fibers are disposed at the incident end face and the outgoing end face of the 1×2 optical switch of Example 1. A laser beam having the wavelength of 1.55 μm is introduced from the optical fiber to the incident port 18, and voltage is applied between the conductive substrate 12 and the upper electrodes 26B and 26C. Accordingly, the refractive index of the optical waveguide layer 16 between the electrodes is decreased, the laser beam introduced from the incident port 18 is totally reflected from the Y-crossover portion 30 to select the outgoing port 20, and switching of the optical fiber path is performed as a digital type of switch. When voltage is applied between the conductive substrate 12 and the upper electrodes 26A and 26C, the outgoing port 22 is selected, and switching of the optical fiber path is similarly performed as a digital type of switch.

Figure 9:
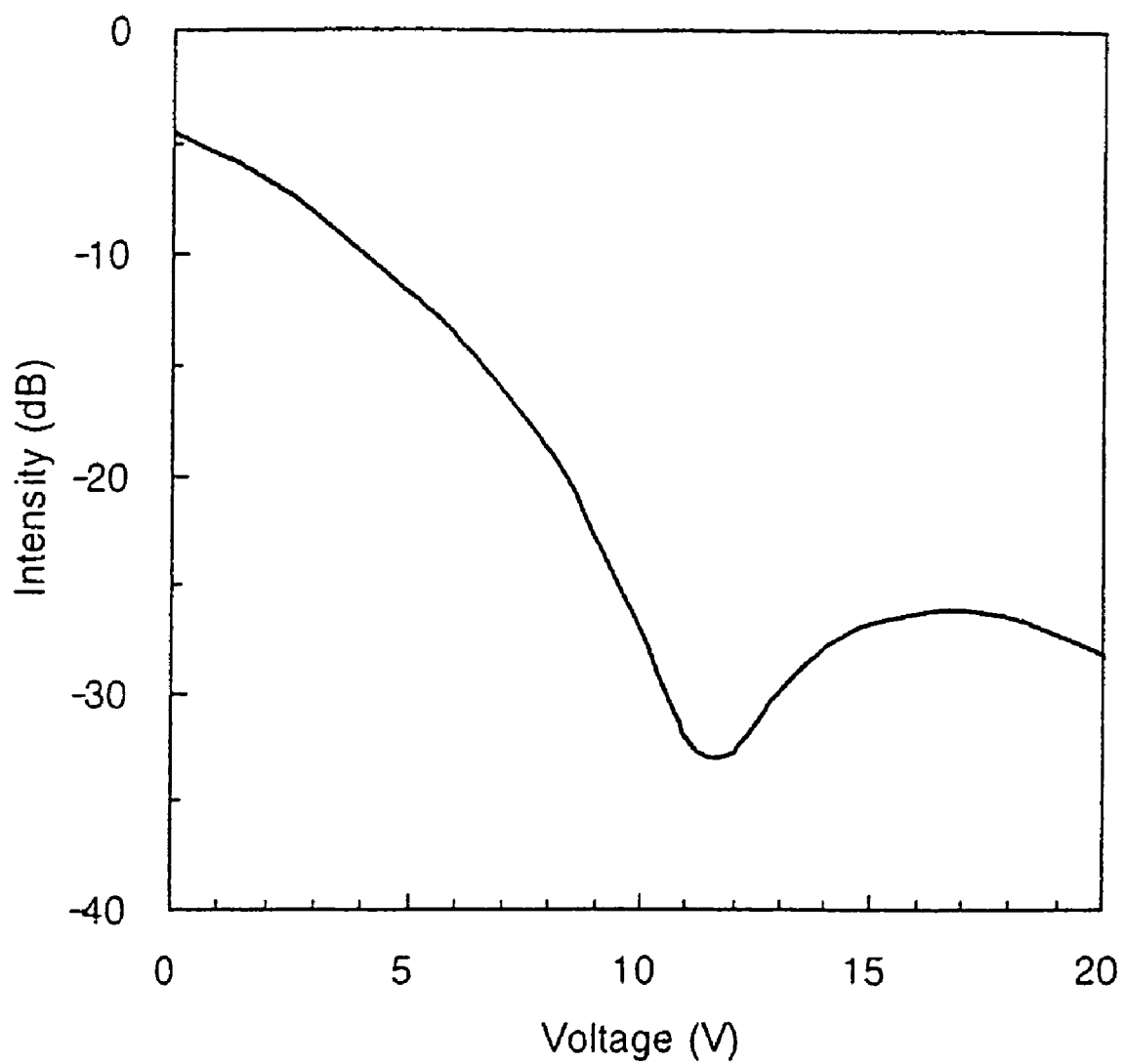
FIG. 9 is a graph showing a relationship between drive voltage and crosstalk in the 1×2 optical switch of Example 1.

FIG. 9 shows a relationship between the drive voltage and the crosstalk (difference in light quantity between the outgoing ports) which are obtained by this optical switch. As can be seen from FIG. 9, the crosstalk becomes 20 dB at voltage 8V, and the digital characteristic can be obtained that the crosstalk not less than 20 dB is maintained as long as the voltage not less than 8V is applied.

As described above, in the produced 1×2 optical switch 10, in spite of the fact that the overall length is as small as about 6 mm, the drive voltage becomes 8V, which is about a fraction of the voltage required for the conventional 1×2 optical switch made of LiNbO$_3$. The switching speed is 3 ns, the crosstalk is not more than 20 dB, and the insertion loss is not more than 3 dB. The 1×2 optical switch which is independent of polarized wave and has good characteristics is obtained.

Example 2

Figure 11:
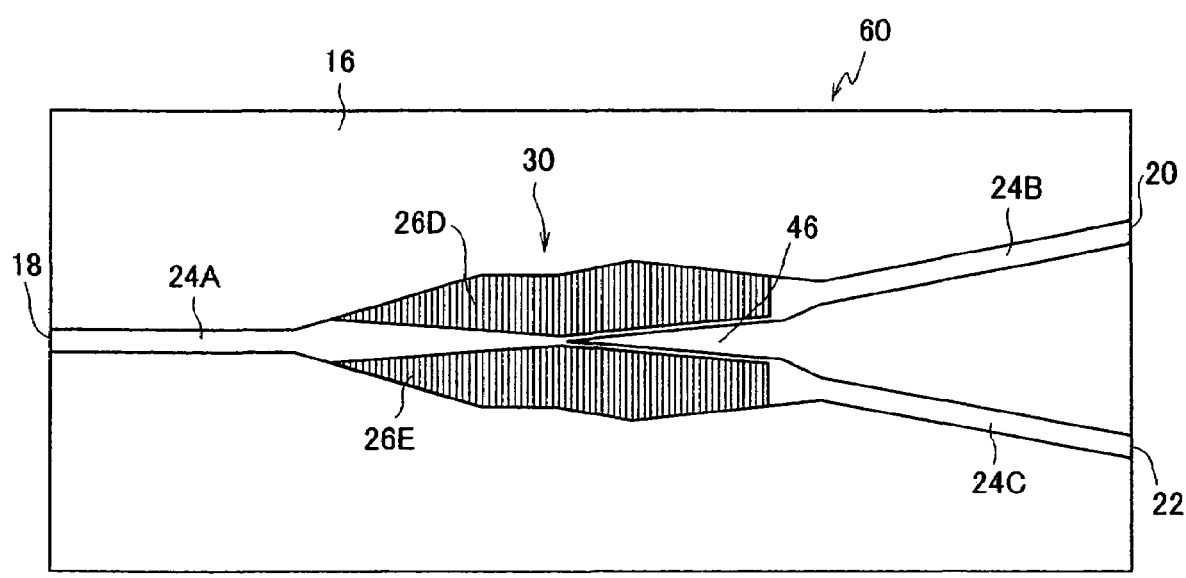
FIG. 11 is a plan view showing a structure of the 1×2 optical switch of Example 2.

In Example 2, the difference in refractive index between the channel waveguide 24 and the cladding portion 25 is set to 0.3%. The width of the channel waveguide is set to 3.5 μm, the taper length is set to 900 μm, the maximum width of the taper portion is set to 24 μm, the length of the linear portion is set to 400 μm, and the Y-crossing angle is set to 0.5°. As shown in FIG. 11, the groove portion 46 is formed instead of the formation of the upper electrode 26C, and the patterns of upper electrodes 26D and 26E are formed so that the channel waveguide 24 is substantially covered with the patterns. Except for the above, a 1×2 optical switch 60 is formed in a manner similar to Example 1.

Figure 12:
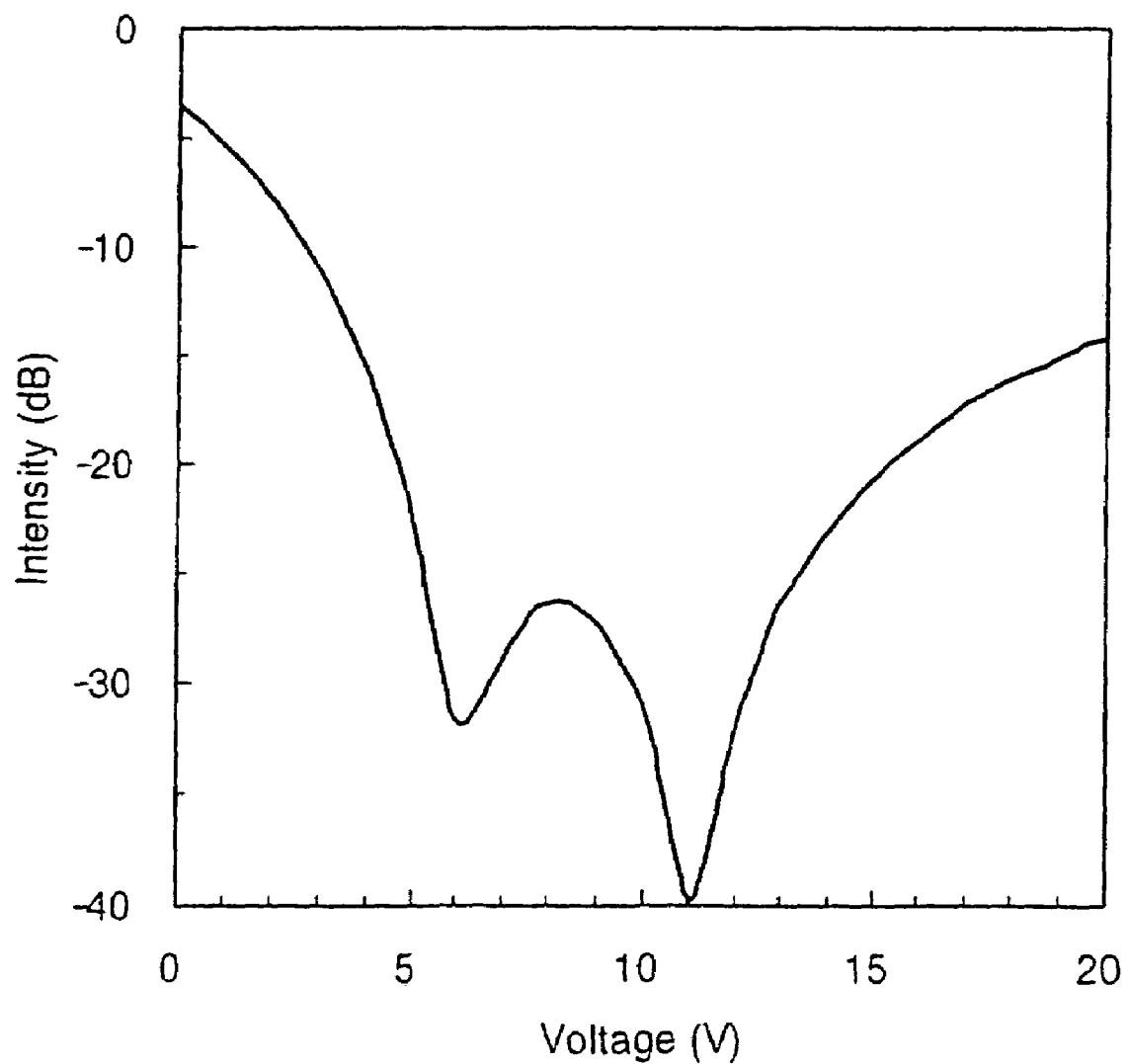
FIG. 12 is a graph showing a relationship between drive voltage and crosstalk in the 1×2 optical switch of Example 2.

When the optical switch 60 is evaluated in the manner similar to Example 1, the relationship between the drive voltage and the crosstalk is obtained as shown in FIG. 12. As can be seen from FIG. 12, the crosstalk becomes 20 dB at voltage 5V, and the digital characteristic can be obtained that the crosstalk not less than 20 dB is maintained as long as the voltage not less than 5V is applied.

As described above, in the produced 1×2 optical switch 60, in spite of the fact that the overall length is as small as about 6 mm, the drive voltage becomes 5V, which is in the range where a CMOS can be driven and which is one-tenth of the voltage required for the conventional 1×2 optical switch made of $LiNbO_3$. The switching speed is 4 ns, the crosstalk is not more than 20 dB, and the insertion loss is not more than 3 dB. The 1×2 optical switch which is independent of polarized wave and has good characteristics is obtained.

Figure 17:
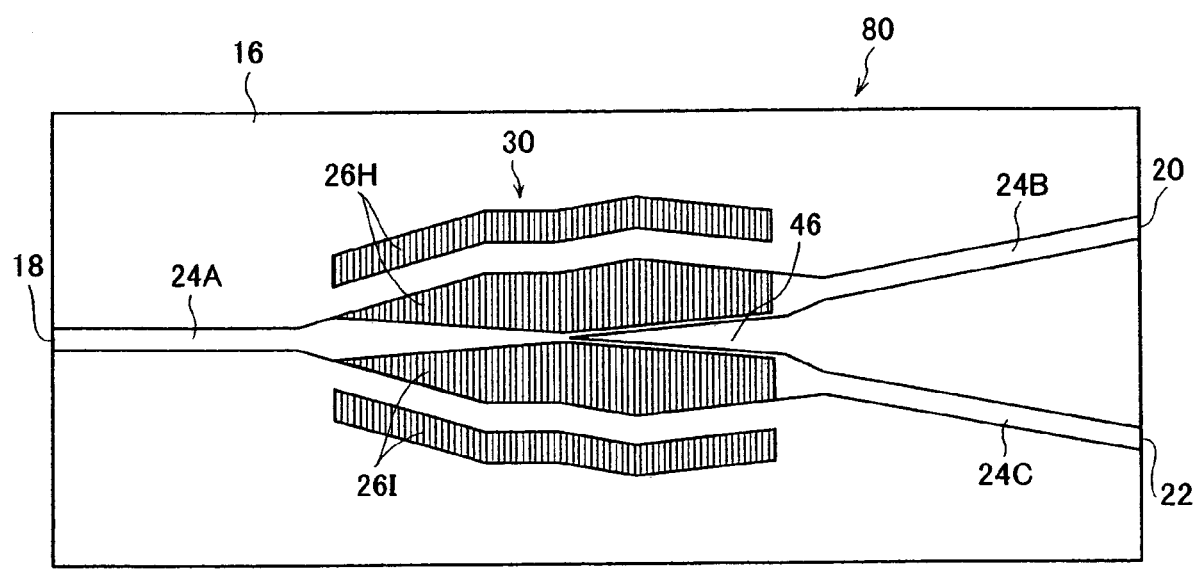
FIG. 17 is a plan view showing a structure of the Y-branching type of 1×2 optical switch formed by a LiNbO₃ waveguide.
Figure 18:
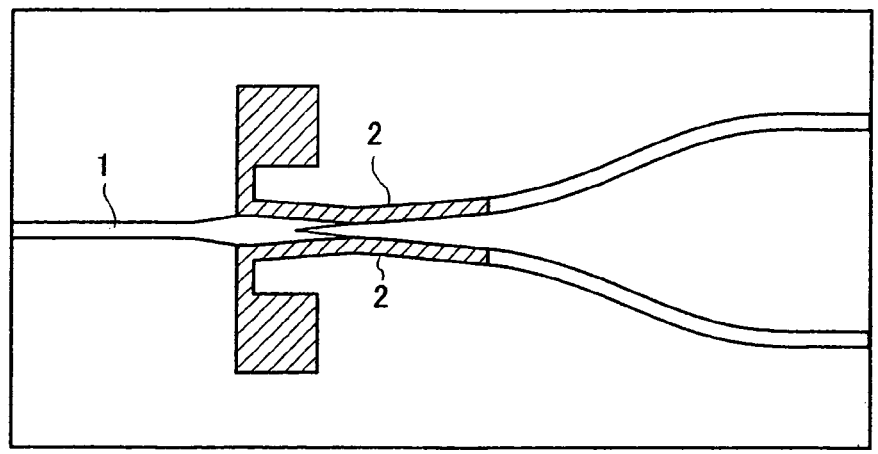
FIG. 18 is a plan view showing a schematic configuration of the conventional Y-branching type of 1×2 optical switch.
Figure 19:
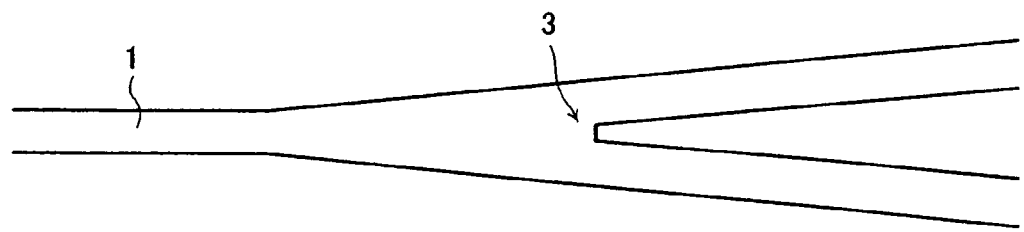
FIG. 19 is a partially expanded view showing a structure of a branching portion in the optical switch of FIG. 18.
Figure 20:
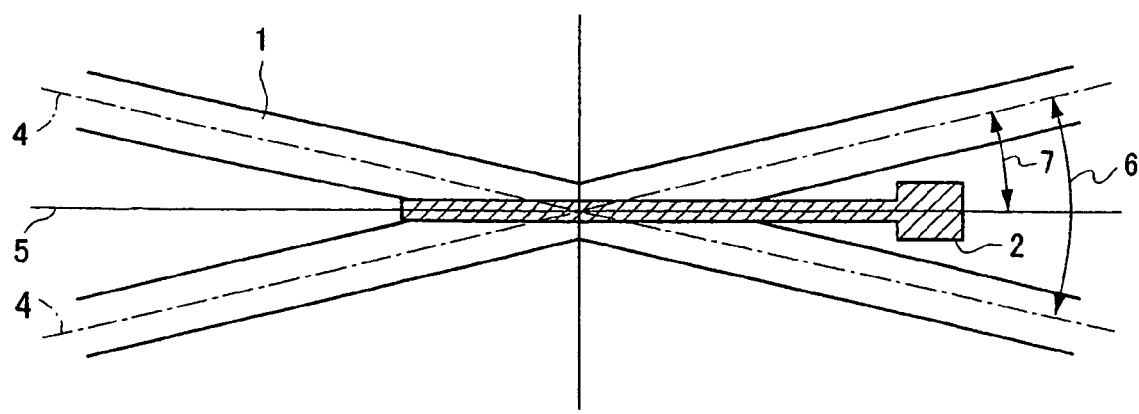
FIG. 20 is a plan view showing a schematic configuration of an X-crossover type of total reflection optical switch.

When a semiconductor waveguide material such as InGaP is used, the optical switch having the plane structure substantially similar to FIG. 11 can be produced. In the case of using a substrate in which a channel waveguide is formed by diffusing Ti in a $LiNbO_3$ single crystal wafer, the patterns of upper electrodes 26H and 26I of FIG. 17 can be formed as a co-planar type of electrode pattern.

Example 3

In Example 3, the difference in refractive index between the channel waveguide 24 and the cladding portion 25 is set to 0.2%, the width of the channel waveguide is set to 4.0 μm, the taper length is set to 700 μm, the maximum width of the taper portion is set to 24 μm, the length of the linear portion is set to 400 μm, and the Y-crossing angle is set to 0.5°. Except for the above, the 1×2 optical switch 60 in which the patterns of the upper electrodes 26D and 26E are formed is formed in the manner similar to Example 2.

Figure 13:
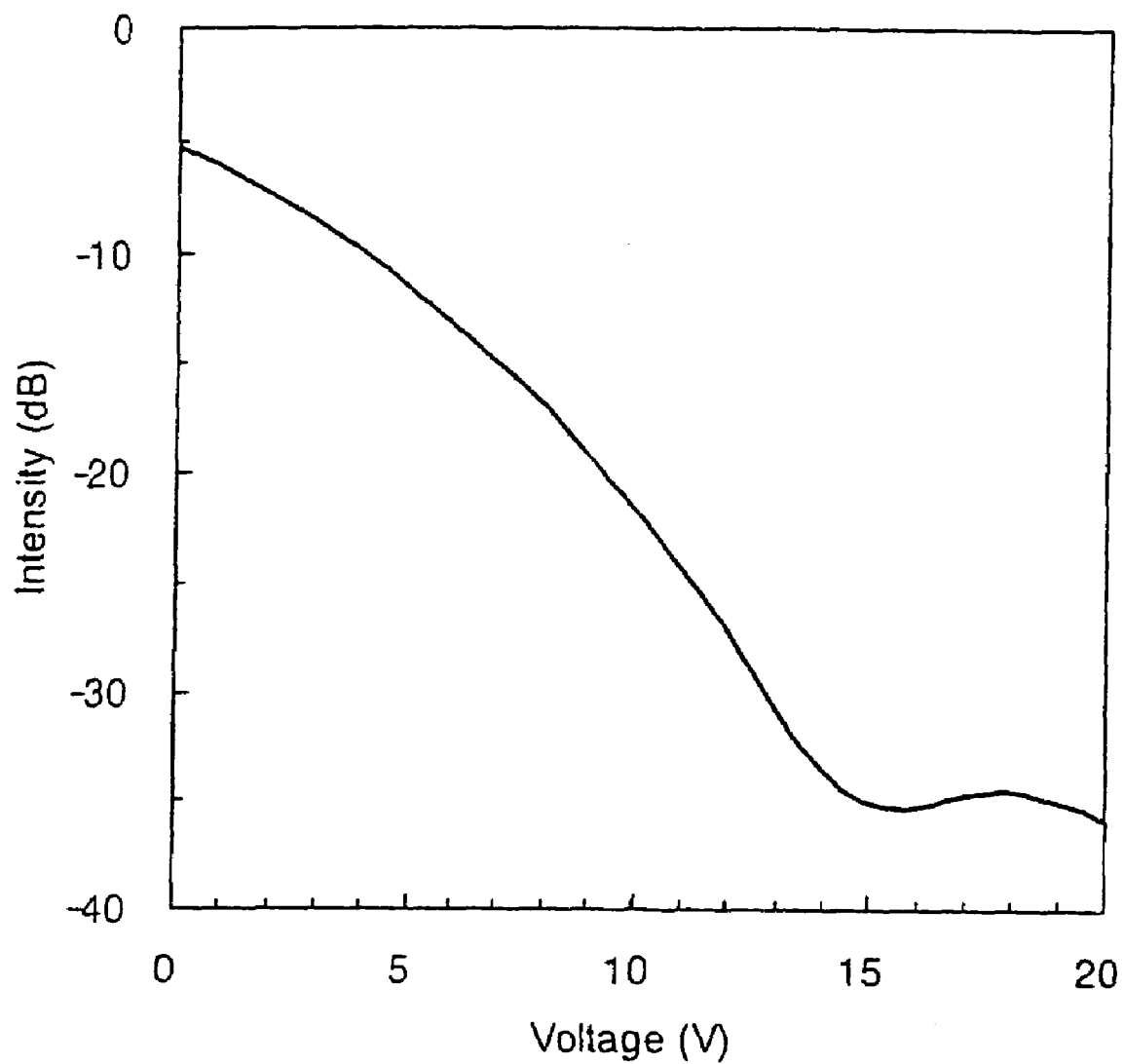
FIG. 13 is a graph showing a relationship between drive voltage and crosstalk in the 1×2 optical switch of Example 3.

When the optical switch 60 is evaluated in the manner similar to Example 1, the relationship between the drive voltage and the crosstalk is obtained as shown in FIG. 13. As can be seen from FIG. 13, the crosstalk becomes 20 dB at voltage 9V, and the digital characteristic can be obtained that the crosstalk not less than 20 dB is maintained as long as the voltage not less than 9V is applied.

As described above, in the produced 1×2 optical switch 60, in spite of the fact that the overall length is as small as about 6 mm, the drive voltage becomes 9V which is about a fraction of the voltage required for the conventional 1×2 optical switch made of $LiNbO_3$. The switching speed is 3 ns, the crosstalk is not more than 20 dB, and the insertion loss is not more than 3 dB. The 1×2 optical switch which is independent of polarized wave and has good characteristics is obtained.

Example 4

In Example 4, as shown in FIG. 14, plural 1×2 optical switches of Example 2 are arrayed on the same substrate 52 by the combination of the 1×2 optical switches to form a 1×8 optical switch 70 in which a channel waveguide 54 having plural branches is formed. One single mode optical fiber is disposed at the incident end face of the optical switch 70 and eight single mode optical fibers are disposed at the outgoing end face at intervals of 254 μm.

A laser beam having the wavelength of 1.55 μm is introduced to the incident port of the 1×8 optical switch of Example 4 from the optical fiber, and the optical fiber path of the laser beam introduced from the incident port is switched in the form of a digital type of optical switch by applying voltage 8V between the conductive substrate 12 and the upper electrode 26D.

When the 1×8 optical switch 70 is evaluated in the manner similar to Example 1, in the produced 1×8 optical switch 70, in spite of the fact that the overall length is as small as about 20 mm, the drive voltage becomes 5V, which is in the range where a CMOS can be driven and which is about one-tenth of the voltage required for the conventional 1×8 optical switch made of $LiNbO_3$. The switching speed is 4 ns, the crosstalk becomes not more than 20 dB, and the insertion loss is not more than 5 dB. The 1×8 optical switch which is independent of polarized wave and has good characteristics is obtained.

Example 5

In Example 5, a digital type and a strictly nonblocking type of 8×8 optical switch 80 is formed by arraying one hundred twelve 1×2 optical switches of Example 2 on the same substrate. A digital type and a strictly nonblocking type of 8×8 optical switch is formed as another example of the invention by combining one hundred twelve 1×2 optical switches having the same configuration as that of Example 2. The incident end face, the outgoing end face, and the 1×2 optical switches are connected to one another with an S-shaped type, linear type, and X-shaped type of channel optical waveguide. Single mode optical fiber arrays in which eight optical fibers are provided at intervals of 127 μm are disposed at the incident end face and the outgoing end face, respectively.

When the produced 8×8 optical switch is evaluated in the manner similar to Example 1, in the 8×8 optical switch, in spite of the fact that the overall length is as small as about 30 mm, the drive voltage becomes 5V which is about one-tenth of the voltage required for the conventional 8×8 optical switch made of $LiNbO_3$. The switching speed is 4 ns, the crosstalk becomes not more than 40 dB because the switch is formed in two stages, and the insertion loss is not more than 7 dB. The 8×8 optical switch which is independent of polarized wave and has good characteristics is obtained.

Example 6

Figure 15:
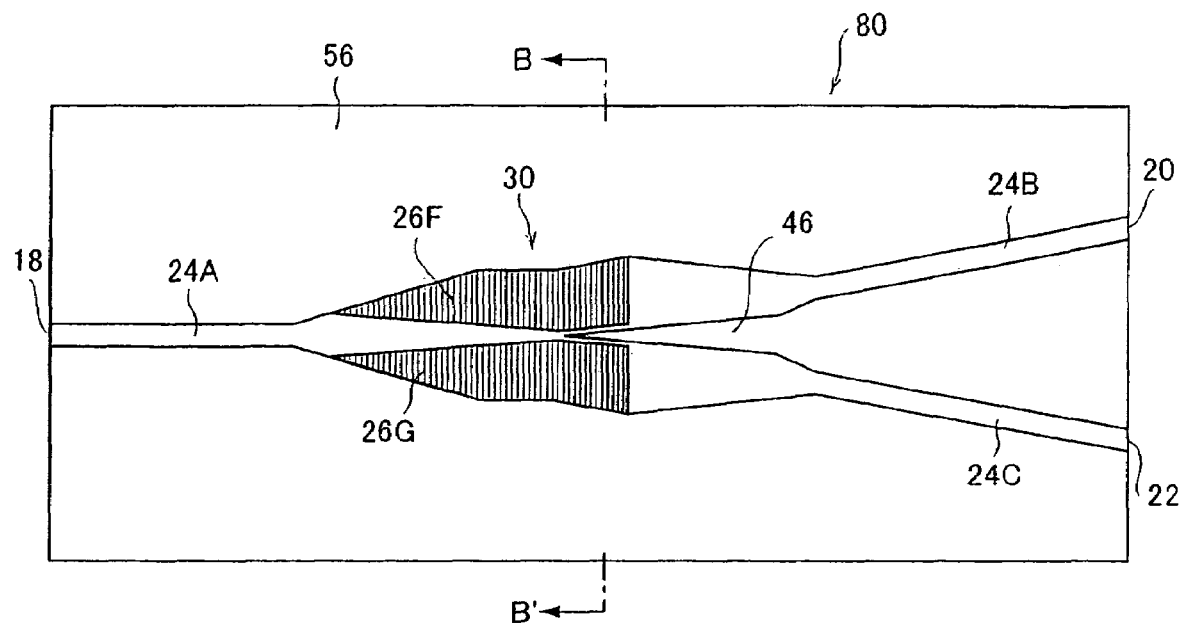
FIG. 15 is a plan view showing a structure of the 1×2 optical switch of Example 6.
Figure 16:
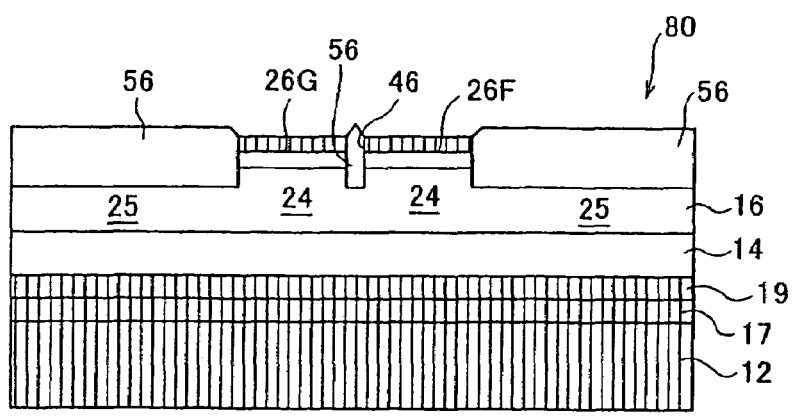
FIG. 16 is a sectional view of the 1×2 optical switch taken on line B-B' of FIG. 15.

In Example 6, the epitaxial MgO (100) film 17 is grown on a conductive substrate formed of Si (100) single crystal semiconductor, and then the $SrRuO_3$ (100) conductive thin film 19 is grown as a lower electrode, and thereafter the PLZT buffer layer 14 and the PLZT optical waveguide layer 16 are formed. The difference in refractive index between the channel waveguide 24 and the cladding portion 25 is set to 0.2%, the width of the channel waveguide is set to 4.0 μm, the taper length is set to 600 μm, the maximum width of the taper portion is set to 24 μm, the length of the linear portion is set to 400 μm, and the Y-crossing angle is set to 0.5°. As shown in FIGS. 15 and 16, the groove portion 46 is formed instead of the formation of the upper electrode 26C, and the patterns of upper electrodes 26F and 26G whose electrode lengths are shortened for the purpose of high speed are formed. A polymer layer 56 is formed as a cladding layer on the optical waveguide layer 16. Except for the above, a 1×2 optical switch 80 is formed in the manner similar to Example 2.

When the produced 1×2 optical switch 80 is evaluated in the manner similar to Example 1, in the 1×2 optical switch 80, in spite of the fact that the overall length is as small as about 6 mm, the digital characteristics that the drive voltage becomes 12V and the crosstalk is 20 dB are obtained, the switching speed is 2 ns, and the insertion loss is not more than 3 dB. The 1×2 optical switch which is independent of polarized wave and has good characteristics is obtained.

In the optical switch of the present invention, it is preferable that the crossing angle ranges from 0.25° to 2.0°. Since the reflection plane is formed near the crossover portion located on the upstream side of the branching portion in the light propagation direction, the reflection plane is hardly affected by the shape of the branching portion of the channel waveguide or the production error of the electrode, and crosstalk is decreased when compared with the conventional Y-branching optical switch.

It is preferable that the control electrode is formed on the optical waveguide layer so that the angle formed by the centerline of the incident-side channel waveguide and the edge of the control electrode on the waveguide side becomes equal to the angle formed by the centerline of the outgoing-side channel waveguide and the edge of the control electrode on the waveguide side, and the incident light signal is totally reflected from the reflection plane.

It is preferable that the taper portion extending toward the propagation direction of the light signal is formed on the outgoing-side of the incident-side channel waveguide and the taper portion is connected to the incident-side of the outgoing-side channel waveguide through the coupling portion. Crosstalk can be further decreased by forming the crossover portion in the tapered shape. It is preferable that the reverse taper portion extending toward the opposite direction to the propagation direction of the light signal is formed on the incident-side of the outgoing-side channel waveguide and the coupling portion is formed by the linear channel waveguide having the same width as that of the outgoing end of the incident-side channel waveguide.

In the optical waveguide layer, it is also possible that the groove is formed between the outgoing-side channel waveguides adjacent to each other. When the groove is formed, the control electrode forms the reflection plane which is contiguous to the interface between the optical waveguide layer and the groove.

What is claimed is:

1. An optical switch comprising:
   a substrate which has at least partial conductivity;
   an optical waveguide layer which is formed on the substrate, the optical waveguide layer including an incident-side channel waveguide, having a centerline and an outgoing side, on which a light signal is incident and a plurality of outgoing-side channel waveguides, each having a centerline and an incident side, and branching from the incident-side channel waveguide; and
   a control electrode having a waveguide side which is formed on a crossover portion of the plurality of the outgoing-side channel waveguides of the optical waveguide layer, the control electrode forming, near the crossover portion of the plurality of outgoing-side channel waveguides, a reflection plane which reflects the incident light signal by applying a voltage to the optical waveguide layer to control the refractive index of the optical waveguide layer, and the control electrode switches propagation paths of the light signal,
   wherein a taper portion which broadens out in the propagation direction of the light signal is formed on the outgoing side of the incident-side channel waveguide, and the taper portion is connected to the incident side of the plurality of the outgoing-side channel waveguides through a coupling portion,
   wherein a reverse taper portion which narrows in the propagation direction of the light signal is formed on the incident side of the plurality of the outgoing-side channel waveguides.

2. An optical switch according to claim 1, wherein a grooved portion is formed between adjacent outgoing-side channel waveguides in the optical waveguide layer.

3. An optical switch according to claim 2,
   wherein the reflection plane being contiguous to an interface between the optical waveguide layer and the grooved portion, and the control electrode switches propagation paths of the light signal.

4. An optical switch according to claim 1, wherein the substrate has semiconductivity.

5. An optical switch according to claim 1, wherein the control electrode is formed on the optical waveguide layer so that an angle formed by a centerline of the incident-side channel waveguide and an edge on a waveguide-side of the control electrode is equal to an angle formed by a centerline of the outgoing-side channel waveguide and the edge on the waveguide-side of the control electrode.

6. An optical switch according to claim 1, wherein an angle formed by two centerlines of adjacent outgoing-side channel waveguides is within the range from 0.5° to 2.0°.

7. An optical switch according to claim 1, wherein the coupling portion is formed by a linear channel waveguide having the same width as the taper portion formed on the outgoing side end of the incident-side channel waveguide.

8. An optical switch according to claim 1, wherein a taper length of the taper portion is within the range from 200 μm to 2000 μm.

9. An optical switch according to claim 1, wherein the maximum width of the taper portion is within the range from 5 μm to 50 μm.

10. An optical switch according to claim 1, wherein a taper length of the reverse taper portion is within the range from 200 μm to 2000 μm.

11. An optical switch according to claim 1, wherein the maximum width of the reverse taper portion is within the range from 5 μm to 50 μm.

12. An optical switch according to claim 1, wherein the substrate includes a single crystal substrate portion, and the optical waveguide layer comprises an electro-optic oxide substance.

13. An optical switch according to claim 12, wherein the single crystal substrate portion has at least partial conductivity.

14. An optical switch according to claim 13, wherein the single crystal substrate portion includes $SrTiO_3$ doped with impurity elements.

15. An optical switch according to claim 12, wherein the substrate has a thin film at least having partial conductivity provided on a surface of the single crystal substrate portion.

16. An optical switch according to claim 15, wherein the thin film has semiconductivity.

17. An optical switch according to claim 15, wherein the single crystal substrate portion comprises Si and has an oxide buffer layer on the surface.

18. An optical switch according to claim 15, wherein the thin film is an epitaxial thin film.

19. An optical switch according to claim 15, wherein the thin film is a thin film having a single orientation.

20. An optical switch according to claim 12, wherein the optical waveguide layer comprises an epitaxial electro-optic oxide substance.

21. An optical switch according to claim 12, wherein the optical waveguide layer comprises an electro-optic oxide substance having a single orientation.

22. An optical switch according to claim 12, wherein a buffer layer having a refractive index smaller than that of the optical waveguide layer is provided between the substrate and the optical waveguide layer.

23. An optical switch according to claim 22, wherein the buffer layer comprises an epitaxial oxide.

24. An optical switch according to claim 22, wherein the buffer layer comprises an oxide having a single orientation.

25. An optical switch according to claim 22, wherein the buffer layer comprises $Pb_{1-x}La_x(Zr_yTi_{1-y})_{1-x/4}O_3$ ($0<x<0.3$ and $0<x<1.0$).

26. An optical switch according to claim 12, wherein a cladding layer comprising an oxide which has a refractive index smaller than that of the optical waveguide layer is provided between the optical waveguide layer and the control electrode.

27. An optical switch according to claim 26, wherein the cladding layer comprises $Pb_{1-x}La_x(Zr_yTi_{1-y})_{1-x/4}O_3$ ($0<x<0.3$ and $0<x<1.0$).

28. An optical switch according to claim 12, wherein the optical waveguide layer comprises $Pb_{1-x}La_x(Zr_yTi_{1-y})_{1-x/4}O_3$ ($0<x<0.3$ and $0<y<1.0$).

29. An optical switch according to claim 1, wherein the incident-side channel waveguide and the outgoing-side channel waveguides are embedded channel waveguides.

30. An optical switch according to claim 1, wherein the incident-side channel waveguide and the outgoing-side channel waveguides are ridge channel waveguides.

31. A matrix optical switch comprising:

a substrate which has at least partial conductivity; and a plurality of optical switch units which are arranged in a matrix on the substrate, wherein each of the plurality of optical switch units includes an optical waveguide layer which is formed on the substrate, the optical waveguide layer including an incident-side channel waveguide, having a centerline and an outgoing side, on which a light signal is incident and a plurality of outgoing-side channel waveguides, each having a centerline and an incident side, and branching from the incident-side channel waveguide; and a control electrode having a waveguide side which is formed on a crossover portion of the plurality of the outgoing-side channel waveguides of the optical waveguide layer, the control electrode forming, near the crossover portion of the plurality of outgoing-side channel waveguides, a reflection plane which reflects the incident light signal by applying a voltage to the optical waveguide layer to control the refractive index of the optical waveguide layer, and the control electrode switches propagation paths of the light signal, wherein a taper portion which broadens out in the propagation direction of the light signal is formed on the outgoing side of the incident-side channel waveguide, and the taper portion is connected to the incident side of the plurality of the outgoing-side channel waveguides through a coupling portion, wherein a reverse taper portion which narrows in the propagation direction of the light signal is formed on the incident side of the plurality of the outgoing-side channel waveguides.

32. A matrix optical switch according to claim 31, wherein the substrate has semiconductivity.

33. A matrix optical switch comprising:

a substrate which has at least partial conductivity; and a plurality of optical switch units which are arranged in a matrix on the substrate, wherein each of the plurality of optical switch units includes an optical waveguide layer which is formed on the substrate, the optical waveguide layer including an incident-side channel waveguide, having a centerline and an outgoing side, on which a light signal is incident and a plurality of outgoing-side channel waveguides, each having a centerline and an incident side, and branching from the incident-side channel waveguide, the optical waveguide layer having a grooved portion formed between adjacent outgoing-side channel waveguides, and a control electrode having a waveguide side which is formed on a crossover portion of the plurality of the outgoing-side channel waveguides of the optical waveguide layer, the control electrode forming, near the crossover portion of the plurality of outgoing-side channel waveguides, a reflection plane reflecting the incident light signal by applying a voltage to the optical waveguide layer to control the refractive index of the optical waveguide layer, the reflection plane being contiguous to an interface between the optical waveguide layer and the grooved portion, and the control electrode switches propagation paths of the light signal, wherein a taper portion which broadens out in the propagation direction of the light signal is formed on the outgoing side of the incident-side channel waveguide, and the taper portion is connected to the incident side of the plurality of the outgoing-side channel waveguides through a coupling portion, wherein a reverse taper portion which narrows in the propagation direction of the light signal is formed on the incident side of the plurality of the outgoing-side channel waveguides.

34. A matrix optical switch according to claim 33, wherein the substrate has semiconductivity.

* * * * *